US008761910B1

(12) United States Patent
Chapman, Jr. et al.

(10) Patent No.: US 8,761,910 B1
(45) Date of Patent: *Jun. 24, 2014

(54) METHOD FOR REMOTELY MONITORING A SITE FOR ANTICIPATED FAILURE AND MAINTENANCE WITH A PLURALITY OF CONTROLS

(71) Applicant: Ashford Technical Software, Inc., Houston, TX (US)

(72) Inventors: Frank Marion Chapman, Jr., Houston, TX (US); Ronald Lyle Brown, Houston, TX (US)

(73) Assignee: Ashford Technical Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,981

(22) Filed: Aug. 28, 2013

Related U.S. Application Data

(63) Continuation-in-part of application No. 12/766,576, filed on Apr. 23, 2010, now Pat. No. 8,560,096, and a continuation-in-part of application No. 12/766,604, filed on Apr. 23, 2010, now Pat. No. 8,560,097, and a continuation of application No. 12/766,625, filed on Apr. 23, 2010, now Pat. No. 8,560,098.

(51) Int. Cl.
| | |
|---|---|
| *E21B 47/00* | (2012.01) |
| *G01F 1/00* | (2006.01) |
| *G01F 1/50* | (2006.01) |
| *G01F 23/00* | (2006.01) |
| *G01V 3/18* | (2006.01) |
| *G05B 11/01* | (2006.01) |
| *G05B 15/00* | (2006.01) |
| *G05B 15/02* | (2006.01) |
| *G06F 3/00* | (2006.01) |
| *G06F 17/00* | (2006.01) |
| *G06F 17/30* | (2006.01) |
| *G06F 19/00* | (2011.01) |
| *G05B 19/00* | (2006.01) |
| *G01N 11/00* | (2006.01) |
| *G05B 13/02* | (2006.01) |
| *E21B 43/12* | (2006.01) |

(52) U.S. Cl.
CPC .................. *G05B 19/00* (2013.01); *E21B 43/12* (2013.01); *G01F 1/50* (2013.01); *G01F 23/00* (2013.01); *G01N 11/00* (2013.01); *G05B 13/02* (2013.01); *G05B 15/00* (2013.01); *G05B 15/02* (2013.01); *G06F 17/30* (2013.01)
USPC . 700/83; 700/9; 700/10; 700/12; 166/250.01; 702/9; 702/12; 702/45; 702/47; 702/50; 702/100; 702/182; 707/790; 715/215; 715/733

(58) Field of Classification Search
CPC ........... E21B 43/12; G01F 1/50; G01F 23/00; G01N 11/00; G05B 13/02; G05B 15/00; G05B 15/02; G05B 19/00; G06F 17/30
USPC ............ 700/9, 10, 12, 83; 166/250.01; 702/9, 702/12, 45, 47, 50, 100, 182; 707/790; 715/215, 733
See application file for complete search history.

(56) References Cited

U.S. PATENT DOCUMENTS

| | | |
|---|---|---|
| 5,465,798 A | 11/1995 | Edlund et al. |
| 6,176,323 B1 | 1/2001 | Weirich et al. |

(Continued)

*Primary Examiner* — Mohammad Ali
*Assistant Examiner* — Jennifer L Norton
(74) *Attorney, Agent, or Firm* — Buskop Law Group, P.C.; Wendy Buskop

(57) ABSTRACT

A method to monitor a status from a secondary location of a plurality of equipment on a drilling site, while simultaneously enabling preventive maintenance is described herein. A user can view at least one cycle, at least one control state, and at least one pressure. The user can also view equipment information, equipment repair history, and other information necessary to ensure that a piece of equipment has minimal down time.

26 Claims, 20 Drawing Sheets

(56) References Cited

U.S. PATENT DOCUMENTS

| | | |
|---|---|---|
| 6,378,628 B1 | 4/2002 | McGuire et al. |
| 8,204,692 B2 * | 6/2012 | Arango et al. .................... 702/9 |
| 2004/0230328 A1 | 11/2004 | Armstrong et al. |
| 2005/0033466 A1 | 2/2005 | Eryurek et al. |
| 2005/0240289 A1 | 10/2005 | Hoyte et al. |
| 2007/0067725 A1 | 3/2007 | Cahill et al. |
| 2009/0044977 A1 | 2/2009 | Johnson et al. |
| 2012/0041574 A1 | 2/2012 | Hsiung et al. |
| 2013/0138254 A1 | 5/2013 | Seals et al. |

* cited by examiner

FIGURE 2

| | |
|---|---|
| SITE DATA STORAGE | 16 |
| COMPUTER INSTRUCTIONS TO FORM A SITE DATABASE WHICH IS USED TO STORE AT LEAST ONE DIGITAL SIGNAL, AT LEAST ONE ANALOG SIGNAL, AT LEAST ONE MESSAGE, AT LEAST ONE REPORT AND COMBINATIONS THEREOF | 18 |
| DIGITAL INPUT MONITOR | 20 |
| ANALOG INPUT MONITOR | 24 |
| DATA TRANSFER DEVICE | 28 |
| SITE TASK DEVICE | 31 |
| SITE PROCESS MONITOR | 38 |
| COMPUTER INSTRUCTIONS FOR CREATING AND STORING AT LEAST ONE REPORT FROM THE DIGITAL INPUT MONITOR, THE ANALOG INPUT MONITOR, THE DATA TRANSFER DEVICE, THE SITE TASK DEVICE, THE SITE PROCESS MONITOR AND THE ANALOG DETAIL MONITOR | 42 |
| COMPUTER INSTRUCTIONS FOR CREATING AND STORING AT LEAST ONE MESSAGE ON THE DIGITAL INPUT MONITOR, THE ANALOG INPUT MONITOR, THE DATA TRANSFER DEVICE, THE SITE TASK DEVICE, THE SITE PROCESS MONITOR AND THE ANALOG DETAIL MONITOR | 44 |
| ANALOG DETAIL MONITOR | 45 |
| CONFIGURATION LIBRARIES | 63 |
| DIGITAL INPUT MONITOR CONFIGURATION LIBRARY | 64 |
| ANALOG INPUT MONITOR CONFIGURATION LIBRARY | 65 |
| SITE TASK DEVICE CONFIGURATION LIBRARY | 66 |
| DATA TRANSFER DEVICE CONFIGURATION LIBRARY | 67 |
| ANALOG DETAIL MONITOR CONFIGURATION LIBRARY | 68 |
| SITE PROCESS MONITOR CONFIGURATION LIBRARY | 69 |
| COMPUTER INSTRUCTIONS FOR CREATING A WEB SERVER AT THE SITE | 70 |
| COMPUTER INSTRUCTIONS TO RECEIVE A REQUEST FOR STATUS OF THE SITE PROCESSOR | 71 |
| COMPUTER INSTRUCTIONS TO RESPOND TO A REQUEST FOR STATUS OF THE SITE PROCESSOR | 72 |

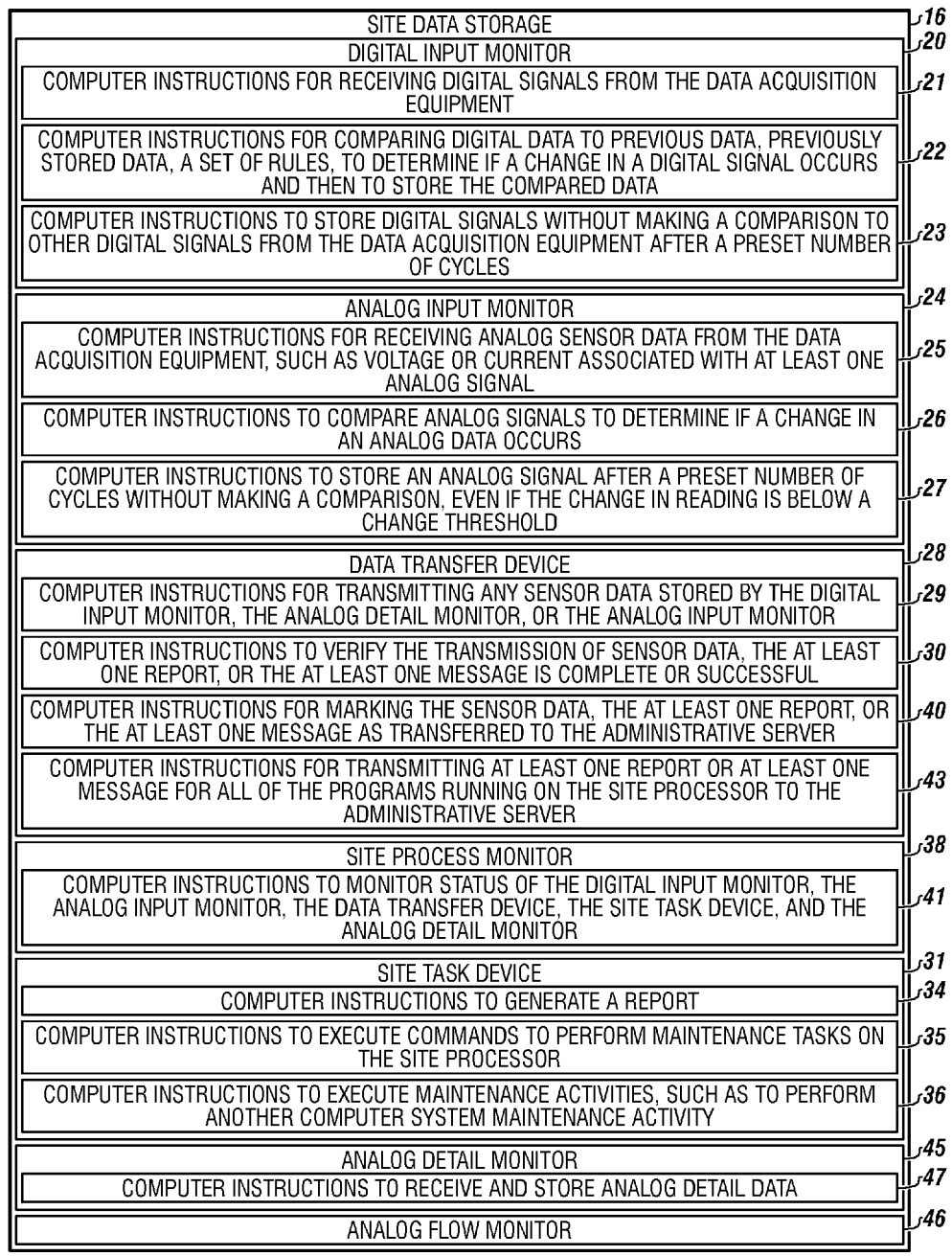

FIGURE 4

| | |
|---|---|
| ADMINISTRATIVE DATA STORAGE | 54 |
| COMPUTER INSTRUCTIONS TO PERFORM THE STEPS OF AN ADMINISTRATIVE PROCESS MONITOR | 76 |
| COMPUTER INSTRUCTIONS TO MONITOR A PLURALITY OF SPECIFIC OFFSHORE OR ONSHORE DRILLING SITES SIMULTANEOUSLY | 78 |
| COMPUTER INSTRUCTIONS TO PERFORM THE STEPS OF AN ADMINISTRATIVE TASK DEVICE | 80 |
| COMPUTER INSTRUCTIONS THAT CREATE AN ADMINISTRATIVE TASK TRANSFER DEVICE | 82 |
| ADMINISTRATIVE CONFIGURATION LIBRARIES | 83 |
| ADMINISTRATIVE PROCESS MONITOR CONFIGURATION LIBRARY | 84 |
| ADMINISTRATIVE SITE MONITOR CONFIGURATION LIBRARY | 86 |
| ADMINISTRATIVE TASK DEVICE CONFIGURATION LIBRARY | 88 |
| ADMINISTRATIVE TASK DEVICE CONFIGURATION LIBRARY | 90 |
| COMPUTER INSTRUCTIONS FOR FORMING AN ADMINISTRATIVE DATABASE | 92 |
| COMPUTER INSTRUCTIONS TO RECEIVE AND STORE STATUS INFORMATION TRANSMITTED OVER THE NETWORK FROM A PLURALITY OF SITES | 93 |
| COMPUTER INSTRUCTIONS TO RECEIVE, VERIFY, AND STORE SENSOR DATA FROM A SITE | 110 |
| COMPUTER INSTRUCTIONS FOR PRESENTING AT LEAST ONE CONTROL STATE TO A USER | 112 |
| COMPUTER INSTRUCTIONS FOR PRESENTING PRESSURE DATA TO THE USER | 114 |
| COMPUTER INSTRUCTIONS FOR PRESENTING VALVE CYCLES TO THE USER | 116 |
| COMPUTER INSTRUCTIONS FOR PRESENTING CONTROL CYCLES TO THE USER | 223 |
| COMPUTER INSTRUCTIONS FOR PRESENTING FLOW DATA TO A USER, WHEREIN THE FLOW DATA IS AT LEAST ONE PNEUMATIC OR HYDRAULIC FLOW VOLUME OR AT LEAST ONE PNEUMATIC OR HYDRAULIC FLOW RATE | 226 |
| COMPUTER INSTRUCTIONS FOR PRESENTING DAYS IN SERVICE FOR VALVES AND CONTROLS TO A USER | 232 |
| COMPUTER INSTRUCTIONS FOR SENDING A REQUEST FOR STATUS | 89 |
| COMPUTER INSTRUCTIONS FOR RECEIVING A RESPONSE TO A REQUEST FOR STATUS | 91 |
| COMPUTER INSTRUCTIONS FOR COMBINING A PLURALITY OF SITE SIGNALS WITH SITE CONFIGURATION INFORMATION TO GENERATE SITE DATA FOR THE PLURALITY OF EQUIPMENT AT THE SITE | 111 |
| COMPUTER INSTRUCTIONS TO ENABLE A USER TO CLEAR A DISPLAY | 234 |
| COMPUTER INSTRUCTIONS TO ALLOW THE USER TO RESET THE NUMBER OF DAYS IN SERVICE FOR EACH CONTROL OR VALVE | 271 |
| COMPUTER INSTRUCTIONS TO ENTER AND DISPLAY A PLURALITY OF CURRENT DAYS IN SERVICE OF EACH CONTROL OR VALVE | 273 |
| COMPUTER INSTRUCTIONS TO ENTER AND DISPLAY A MAXIMUM ALLOWED DAYS IN SERVICE | 275 |
| COMPUTER INSTRUCTIONS TO CALCULATE AND DISPLAY A CURRENT PERCENTAGE OF MAXIMUM DAYS IN SERVICE | 276 |
| COMPUTER INSTRUCTIONS TO ENTER AND DISPLAY CONTROL OR VALVE MANUFACTURING INFORMATION, SUCH AS MANUFACTURER NAME, SERIAL NUMBER, MAXIMUM ALLOWED CYCLES, AND MAXIMUM NUMBER OF DAYS IN SERVICE | 277 |

FIGURE 5

| | |
|---|---|
| ADMINISTRATIVE DATABASE | 92 |
| PLURALITY OF SITE SIGNALS | 97 |
| DIGITAL SIGNAL | 95 |
| ANALOG SIGNAL | 96 |
| MESSAGE | 98 |
| REPORT | 100 |
| SITE CONFIGURATION INFORMATION | 106 |
| SITE INFORMATION | 101 |
| CONTROL INFORMATION | 102 |
| PRESSURE INFORMATION | 103 |
| USER SECURITY INFORMATION | 107 |
| CONTROL VALVE INFORMATION | 108 |
| PNEUMATIC OR HYDRAULIC FLOW VOLUME OR FLOW RATE INFORMATION | 228 |
| STRESS INFORMATION | 733 |
| TEMPERATURE INFORMATION | 734 |
| WELL INFORMATION | 735 |
| SITE DATA | 125 |
| CONTROL STATE DATA | 105 |
| CONTROL VALVE DATA | 109 |
| CONTROL CYCLE DATA | 113 |
| PRESSURE DATA | 115 |
| TEMPERATURE DATA | 730 |
| STRESS DATA | 731 |
| WELL DATA | 732 |
| PNEUMATIC OR HYDRAULIC FLOW VOLUME OR FLOW RATE | 751 |
| PNEUMATIC OR HYDRAULIC FLOW VOLUMES | 752 |

FIGURE 15A

| | |
|---|---|
| FORMING A DATABASE FOR SENSOR DATA IN THE SITE DATA STORAGE USING COMPUTER INSTRUCTIONS IN THE SITE DATA STORAGE | 501 |
| INSTALLING A PLURALITY OF SITE CONFIGURATION LIBRARIES IN THE SITE DATA STORAGE | 502 |
| CREATING A SITE BASED WEBSITE IN THE SITE DATA STORAGE | 503 |
| RECEIVING AND STORING SENSOR DATA IN THE SITE DATA STORAGE FROM AT LEAST ONE SENSOR ATTACHED TO AN EQUIPMENT AT THE SITE | 504 |
| RECEIVING SENSOR DATA, VERIFYING THAT THE SENSOR DATA HAS BEEN RECEIVED AND STORING THE SENSOR DATA IN THE DATABASE IN THE SITE DATA STORAGE | 505 |
| TRACKING DIGITAL INPUT USING A DIGITAL INPUT MONITOR | 506 |
| TRACKING ANALOG INPUT USING AN ANALOG INPUT MONITOR | 507 |
| TRACKING ANALOG DETAIL INPUT USING AN ANALOG DETAIL MONITOR | 508 |
| TRANSFERRING THE DIGITAL INPUT, THE ANALOG INPUT, THE ANALOG DETAIL INPUT OR COMBINATIONS THEREOF USING A DATA TRANSFER DEVICE | 509 |
| USING A SITE TASK DEVICE TO MONITOR THE DATABASE, TO IDENTIFY A SPECIFIC TASK AND TO PERFORM THE SPECIFIC TASK | 510 |
| MONITORING THE DIGITAL INPUT MONITOR, THE ANALOG INPUT MONITOR, THE ANALOG DETAIL MONITOR, THE DATA TRANSFER DEVICE AND THE SITE TASK DEVICE BY USING A SITE PROCESS MONITOR | 511 |
| HAVING THE SITE PROCESSOR RECEIVE AT LEAST ONE REQUEST FOR STATUS FROM THE ADMINISTRATIVE PROCESSOR | 512 |
| HAVING THE SITE PROCESSOR RESPOND TO THE REQUEST FOR STATUS BY THE ADMINISTRATIVE PROCESSOR | 513 |
| USING ADMINISTRATIVE DATA STORAGE AT A SECONDARY LOCATION IN COMMUNICATION WITH AN ADMINISTRATIVE PROCESSOR, WHEREIN THE ADMINISTRATIVE PROCESSOR IMPLEMENTS A PLURALITY OF FUNCTIONALITIES | 520 |
| INSTALLING A PLURALITY OF ADMINISTRATIVE CONFIGURATION LIBRARIES IN THE ADMINISTRATIVE SERVER | 521 |
| FORMING AN ADMINISTRATIVE DATABASE | 522 |
| FORMING AN ADMINISTRATIVE WEB SERVER, WHEREIN THE WEB SERVER RECEIVES, VERIFIES AND STORES THE PLURALITY OF SITE SIGNALS TRANSMITTED FROM THE SITE PROCESSOR | 523 |
| TRANSMITTING AT LEAST ONE TASK TO THE SITE DATABASE USING AN ADMINISTRATIVE TASK TRANSFER DEVICE | 524 |
| HAVING THE ADMINISTRATIVE PROCESSOR RECEIVE A RESPONSE FROM THE SITE DATA STORAGE | 525 |
| RECEIVING SENSOR DATA, A MESSAGE, A REPORT, OR COMBINATIONS THEREOF FROM THE SITE DATA STORAGE | 526 |
| COMBINING THE SITE CONFIGURATION INFORMATION WITH THE PLURALITY OF SITE SIGNALS TO GENERATE SITE DATA FOR EQUIPMENT AT THE SITE | 527 |

(15B)

(15A)

| | |
|---|---|
| PRESENTING AT LEAST ONE CONTROLS STATE TO A USER | 528 |
| PRESENTING PRESSURE DATA TO A USER | 529 |
| PRESENTING CONTROL CYCLES TO A USER | 530 |
| PRESENTING AT LEAST ONE VALVE CYCLE TO A USER | 531 |
| USING AT LEAST ONE USER CLIENT DEVICE TO COMMUNICATE WITH A PLURALITY OF SITES, WHEREIN THE USER CLIENT DEVICE HAS A USER DISPLAY, A USER PROCESSOR, AND A USER DATA STORAGE IN COMMUNICATION WITH THE USER PROCESSOR | 532 |
| PRESENTING FLOW DATA TO A USER | 533 |
| PRESENTING CONTROL OR VALVE DAYS IN SERVICE TO A USER | 534 |
| PRESENTING TEMPERATURE DATA TO A USER | 535 |
| PRESENTING STRESS DATA TO A USER | 536 |
| PRESENTING WELL INFORMATION TO A USER | 537 |

FIGURE 15B

METHOD FOR REMOTELY MONITORING A SITE FOR ANTICIPATED FAILURE AND MAINTENANCE WITH A PLURALITY OF CONTROLS

CROSS REFERENCE TO RELATED APPLICATIONS

The present application is a Continuation in Part of U.S. patent application Ser. No. 12/766,576 filed on Apr. 23, 2010, entitled "METHOD FOR REMOTELY MONITORING A SITE FOR ANTICIPATED FAILURE AND MAINTENANCE WITH A PLURALITY OF CONTROLS," U.S. patent application Ser. No. 12/766,604 filed on Apr. 23, 2010, entitled "COMPUTER ASSISTED METHOD FOR REMOTELY MONITORING A SITE FOR ANTICIPATED FAILURE AND MAINTENANCE WITH A PLURALITY OF CONTROLS," and U.S. patent application Ser. No. 12/766,625 filed on Apr. 23, 2010, entitled "SYSTEM FOR REMOTELY MONITORING A SITE FOR ANTICIPATED FAILURE AND MAINTENANCE WITH A PLURALITY OF CONTROLS" and". These references are hereby incorporated in their entirety.

FIELD

The present embodiments generally relate to a method for monitoring a status from a secondary location of a plurality of equipment on a drilling site, while simultaneously enabling preventive maintenance of the plurality of equipment.

BACKGROUND

A need exists for a simple computer implemented method operable without the need for training to detect changes in state of various components or parts of components used to drill oil and natural gas wells, or water wells that can be viewed locally, within a few feet of a site, or remotely, thousands of miles away, simultaneously, and allow for maintenance planning.

A need exists for a method to continuously and automatically monitor onshore and offshore drilling operations to ensure a safe, efficient, and cost effective drilling operation.

A need exists for a method to automatically track equipment utilization, equipment cycles, equipment days in service, and valve cycles to provide for preventive maintenance, elimination of costly downtime, environmental protection, and an increase in safety by identifying equipment in need of repair and maintenance.

A need exists for a method that tracks information associated with a drilling operation including a historical status of the drilling and safety equipment, particularly when the drilling operation is at a remote location that can take several days to reach.

A further need exists for a method that allows management, drilling experts, and other operations personnel to remain physically remote from the drilling site, while having easy and timely access to the status of a drilling operation and safety equipment.

The present embodiments meet these needs.

BRIEF DESCRIPTION OF THE DRAWINGS

The detailed description will be better understood in conjunction with the accompanying drawings as follows:

FIG. 2 is a diagram of the computer instructions within site data storage.

FIG. 3 is a depiction of the computer instructions to form the monitors and devices of the site data storage.

FIG. 4 is diagram of the computer instructions within the administrative data storage.

FIG. 5 is a diagram of components within the administrative database.

FIGS. 15A and 15B depict steps of the method.

Figure 1:
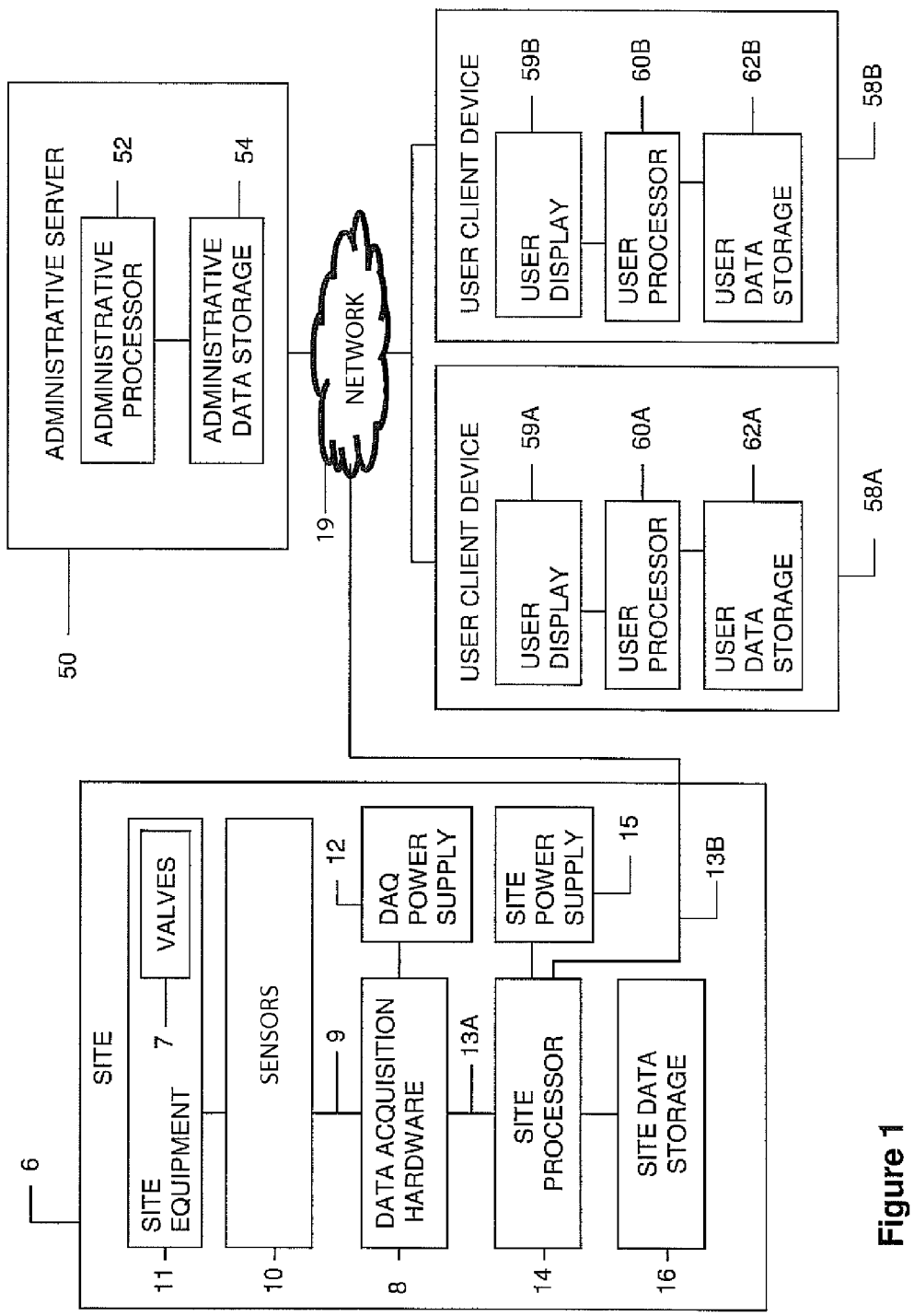
FIG. 1 is a diagram of the system usable with the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method to monitor a status from a secondary location of a plurality of equipment at a drilling site, such as a drilling rig for drilling natural gas or oil wells, while simultaneously enabling preventive maintenance for the plurality of equipment on the site.

The method can be used to continuously and automatically monitor onshore and offshore drilling operations to ensure safe, efficient, and cost effective drilling operations. Repairing drilling and safety equipment during a drilling operation can be time consuming and costly. For example, in an offshore drilling operation, replacing a $25.00 valve on a subsea blowout preventer can cause two or three days of lost drilling time and millions of dollars in added costs.

The method can be used for tracking equipment utilization, equipment cycles, equipment days in service, and valve cycles to provide for preventative maintenance, elimination of costly downtime, environmental protection, and an increase in safety by identifying equipment in need of repair and maintenance. For example, equipment failure during a drilling operation can lead to blowouts that endanger personnel, endanger equipment, and can have a severe impact on the environment.

The method can save fossil fuels by improving operational efficiency and eliminating unnecessary activities.

The method can protect the environment by eliminating the accidental release of toxic material that can result from equipment failure or operational failure.

A drilling operator can trouble-shoot a problem at the site, even if the experienced personnel of the drilling operator are not physically at the site.

The method monitors a status of a plurality of drilling equipment from a secondary location while simultaneously enabling preventive maintenance is described herein.

In an embodiment, the site equipment can be a valve, a blowout preventer, other drilling equipment, a pressure line in a subsea umbilical, or combinations thereof.

In an embodiment, the sensor data being received by the inventive method can be a digital signal, an analog signal, a message, a report, or combinations thereof. Examples of the message, the report, a presentation, or a document and user administration item for selection by a user can include at least one control status chart, at least one control status table, at least one pressure chart, at least one pressure table, at least one control cycle, at least one valve cycle, at least one selected rig, at least one hydraulic or pneumatic flow, at least one temperature report, at least one stress report, at least one well data report, and a log out. Other reports and presentations can include a pressure change details report.

At a site, the method can use data acquisition hardware for receiving and storing sensor data from sensors attached to one or more pieces of equipment at the site.

The method can have a site processor in communication with site data storage for receiving the sensor data from the data acquisition hardware. The site processor can be a computer and function as a site server. The sensor data can be transmitted to an administrative server from the site processor via a network. The network can include the Internet.

In an embodiment, the site process monitor can be formed using computer instructions in the site data storage to monitor a status of a digital input monitor, an analog input monitor, a data transfer device, an analog detail monitor, a site task processor device, or combinations thereof.

The computer instructions usable with the method can be non-transitory computer instructions.

The method uses computer instructions in the site data storage to form a database of the sensor data.

The method can have a digital input monitor formed from computer instructions in the site data storage, as well as an analog input monitor formed from computer instructions in the site data storage, an analog detail monitor formed from computer instructions in the site data storage, a data transfer device formed from computer instructions in the site data storage, a site task device formed from computer instructions in the site data storage, and combinations thereof.

The digital input monitor is formed from computer instructions in the site data storage for monitoring digital sensor data from the data acquisition equipment, and includes computer instructions in the site data storage to compare digital sensor data to historical digital sensor data or preinstalled rules to determine if a change in the digital sensor data occurs and to then store the compared data once a change occurs to the data. In other embodiments, the digital input monitor is formed from computer instructions in the site data storage to store digital sensor data after a preset number of cycles of a valve or a control.

The digital input monitor in embodiments, reads the sensor data on a periodic cycle and can mask any unused digital bits. The digital input monitor determines if a change in the digital sensor information and sensor data occurs. For example, if the digital data changes, these computer instructions can store both the original digital data and the changed digital data to the database, as well as a time stamp of the changes.

The digital input monitor stores sensor data to the site database after a preset number of cycles, even if the digital data is unchanged. For example, for a blowout preventer ram on an oil rig, the digital input monitor can determine whether the ram cycled and store this information to the site database. The digital input monitor can also time stamp this information to indicate when the ram cycle occurred.

The analog input monitor has computer instructions in the site data storage for monitoring analog sensor data from the data acquisition equipment, computer instructions in the site data storage to compare analog sensor data to determine if a change in the analog sensor data occurs and to store the data once a change occurs, or computer instructions in the site data storage to store analog sensor data after a preset number of cycles.

The analog input monitor can, as an example, monitor voltage and current data from the data acquisition hardware on a periodic time cycle. The analog input monitor can determine if a change in sensor voltage or current is significant. If the change is significant, both the previous voltage and the current voltage or current data can be stored to the database along with a time stamp indicating when the change occurred.

The analog input monitor can store sensor data in the site data storage after a preset number of cycles even if the sensor data is unchanged, such as storing sensor data after every 25 cycles.

As used herein, the term "data transfer device" refers to computer instructions in the site data storage to transmit the sensor data sensor data stored by the digital input monitor, the analog input monitor, the analog detail monitor, or combinations thereof.

The data transfer device has computer instructions in the site data storage to verify a transfer of the digital sensor data and the analog sensor data is complete, or computer instructions in the site data storage to mark the digital sensor data and the analog sensor data as transferred.

The data transfer device has computer instructions to transmit at least one message and at least one report stored by the digital input monitor, the analog input monitor, the analog detail monitor, the data transfer device, the site process monitor, and the site task device.

The data transfer device includes computer instructions to verify that a transfer of messages and at least one report is complete. The data transfer device uses computer instructions to verify the occurrence of a transfer by receiving either a positive response or a negative response from the administrative server.

As used herein, the term "site task device" includes computer instructions in the site data storage to generate a report on disk utilization, as well as computer instructions in the site data storage to execute an operating system utility command, or computer instructions in the site data storage to perform another computer system maintenance activity. Another computer system maintenance activity can create a list of the programs running on the computer. The list can include the memory and central processor utilization for each program running on the computer.

The method can have a site process monitor in the site data storage for monitoring the digital input monitor, the analog input monitor, the analog detail monitor, the data transfer device, and the site task device.

As used herein, the term "site process monitor" refers to computer instructions monitors all the software which is running on the administrative server, and store errors or other information relative to the performance and functioning of the software in the administrative server.

The site process monitor can start or end all of the other monitors and devices.

The site process occurs by periodically polling each monitor or device to determine if it is currently running and if it is functioning correctly.

The method has an analog detail monitor in the site data storage. The term "analog detail monitor" includes computer instructions in the site data storage for monitoring analog data from the data acquisition hardware. The analog detail monitor has computer instructions in the site data storage to compare analog sensor data to previously collected data or with a set of stored rules or with preset limits to determine if a change in analog sensor data.

As used herein, the term "digital input monitor" refers to computer instructions which receive digital sensor data from a particular piece of equipment at the site, analyzes the digital sensor data to be within preset limits, and stores the sensor data in site data storage and optionally presents the digital sensor data on a display. If the analyzed digital sensor data is outside preset limits, the digital input monitor provides an alarm to at least one user client device.

As used herein, the term "analog input monitor" refers to computer instructions which receive analog sensor data from a particular piece of equipment at the site, analyzes the analog sensor data to be within preset limits, and stores the sensor data in site data storage and optionally presents the analog sensor data on a display. If the analyzed analog sensor data is outside preset limits, the analog input monitor provides an alarm to at least one user client device.

The method includes an analog detail monitor. The term "analog detail monitor" refers to computer instructions to monitor sensor data on a rapid data sampling cycle and continuously save the sensor data to a data buffer in the site data storage. When the analog detail monitor detects a significant change in either voltage or current, additional data can be added to the buffer until a full window of data has been collected. When a complete window of data has been collected, it can be saved to the database.

The method includes an analog flow monitor to receive and store flow rate and flow volume data.

The term "rapid sampling rate," as used herein, means changes in voltage or current data that can occur within 100 milliseconds to 500 milliseconds. For example, the analog detail monitor can be capable of monitoring, collecting and storing a detailed pressure versus time profile over several minutes with a sampling rate of 100 milliseconds.

The method can have a plurality of configuration libraries. The plurality of configuration libraries can include a digital input monitor configuration library, an analog input monitor configuration library, a site task device configuration library, a data transfer device configuration library, an analog detail monitor configuration library or a site process monitor configuration library.

In an embodiment, the digital input monitor configuration library can include a site identifier (ID); a database connection information; a digital data acquisition hardware and bit configuration; an unused bit mask; a power-on, a lamp test, and an alarm bit identification; a digital data acquisition hardware read and poll intervals; and an identifier for the software driver used to communicate with the digital data acquisition hardware.

In an embodiment, the analog input monitor configuration library can include information such as: the site identifier (ID), the database connection information, the analog data acquisition hardware and I/O configuration, an unused I/O channel mask, the significant voltage or current change thresholds, the analog data acquisition hardware read and poll intervals, and an identifier for the software driver used to communicate with the analog data acquisition hardware.

In an embodiment, the analog detail monitor configuration library can include the site identifier (ID), the database connection information, the analog data acquisitions hardware and I/O configuration, an unused I/O channel mask, the sampling rate, the size of the sampling window, and an identifier for the software driver used to communicate with the analog data acquisition hardware.

In an embodiment, the site task device configuration library can include the site identifier (ID), the database connection information, and the wait interval for checking to see if there are any tasks to perform.

In an embodiment, the data transfer device configuration library can include the site identifier (ID), the database connection information, the wait interval between data transfers, and the maximum number of data elements transferred in any one transfer cycle can be included as one of the plurality of libraries.

In an embodiment, the site process monitor configuration library can include the site identifier (ID), the database connection information, an identifier for each process to be monitored including a type of process indicator, the maximum allowable restarts for any failing process, the time interval for checking on the monitored processes, and a system startup hold-off time interval.

The method can have site web server computer instructions in the site data storage to allow web access to the site data storage, site web server computer instructions in the site data storage to receive a request for status of the site processor, or combinations thereof.

The request for status can take the form of a web report. The web report can summarize the most recent messages and reports that were generated by the various monitors and devices, the last time each monitor and device completed a cycle, and the last time any sensor data was sent to the administrative server.

At a secondary location, the method uses an administrative server in communication with a site via a network, such as the Internet. The administrative server can have an administrative processor.

It is important to make a distinction between the data that can be generated at the site and the data that can be ultimately presented to the end user. The sensor data can be captured by the site processor and can be viewed as raw data. This raw data can be transferred to the administrative server and stored. The administrative server can generate various user reports and displays from this raw data.

The administrative server can transform the raw data into useful information, performing various analyses and correlations on the raw data or information, and presenting this information to the end user, so that the user can easily and quickly understood the information.

It is not anticipated that an end user has access to the site processor or that there is a local program or function on the site processor for the end user to use. An end user at the site, like other remote end users can log onto an administrative server to view information regarding the equipment at the site.

The method uses an administrative data storage in the administrative server. The administrative data storage has an administrative process monitor, an administrative site monitor, an administrative task device, or an administrative task transfer device.

The administrative process monitor initiates and monitors the administrative site monitor, the administrative task device, and the administrative task transfer device. The administrative process monitor can periodically check on the status of each monitor and device. If one of the monitors or the devices is malfunctioning, the administrative process monitor can restart each malfunctioning monitor or device.

The administrative site monitor can periodically send a message to each site being monitored to determine if the site is functioning correctly and that the communication link to the site is working. If the administrative site monitor does not receive a response from the particular site, the administrative site monitor can generate a message in the administrative server database.

The administrative task device can be similar to the site task device. The administrative task device can perform various utility tasks on the administrative server. The administrative task device can check the database to see if there are any tasks it should perform. If a task is found, the administrative task device can perform the task and report the results to the database.

The administrative task transfer device can transfer tasks to be performed on one of the sites to the site's database. The administrative task transfer device can check the administrative database to see if there are any tasks to transfer to one of the sites. If a task is found, the administrative task transfer device can transfer the task to the appropriate site database. If the transfer is successful, the task can be marked in the database as having been transferred.

The administrative server can have a plurality of administrative configuration libraries, or combinations thereof. In an embodiment, the plurality of administrative configuration libraries can include an administrative process monitor configuration library, an administrative site monitor configuration library, an administrative task device configuration library, or an administrative task transfer device configuration library.

The administrative process monitor configuration library can include information, such as an identifier for each process to be monitored including a type of process indicator, database connection information, the maximum allowable number of restarts for any failing process, the time interval for checking the processes, a system startup hold-off time interval, or combinations thereof.

The administrative site monitor configuration library can include information, such as an identifier for each site being monitored, database connection information, the time wait interval between site monitoring requests.

The administrative task device configuration library can include database connection information, or information related to the time wait interval between checks to see if there are any tasks to perform, or combinations thereof.

The administrative task transfer device configuration library can include database connection information, or information on the time wait interval between checks to see if there are any tasks to transfer to various sites, or combinations thereof.

The administrative data storage can have computer instructions for forming an administrative database. The administrative database can store sensor data from the site. The administrative database can include a name of each piece of equipment at the site being monitored, a model number, an age, and specification information on the equipment, such as information on how to replace the equipment and the cost of the equipment.

Additional database information can include a time stamp to indicate when a data item is saved to the database. Data items can include an analog voltage data, analog current data, a digital data, an error or information message, or an error or information report.

The administrative data storage can have computer instructions for forming an administrative web server. The administrative web server can receive and store the sensor data to the administrative data storage. The sensor data can be transmitted from the site to the administrative web server via the network.

The administrative data storage can have computer instructions for receiving, verifying, and storing site signals.

The administrative data storage can have computer instructions for combining a plurality of site signals with site configuration information to generate site data for the plurality of equipment at the site.

In an embodiment, the site configuration information can be site information, site control information, site control valve information, user security information, site flow information, site temperature information, site stress information, site well information, or site pressure information.

Site information can include details about the site, such as the location of the drilling rig, the IP address, rig identification number, or combinations thereof.

Site control information can include details about the controls, such as the functions of the control or the mapping between the digital sensor data and the control.

The site control valve information can include details about the valve, such as maximum cycles of the valve, the valve type, the valve location, the valve function, or combinations thereof.

Site flow information can include details about the flow such as a flow identifier; description of the flow being monitored; flow rates and flow volumes; expected flow rates and expected flow volumes; or combinations thereof.

The user security information can include security-related information for the user to access the administrative server. To access the administrative server, the user must input certain security-related information. Each user has a security profile that determines what the user can access on the administrative server.

Site pressure information can include details about the site pressures, such as pressure type, pressure range, or combinations thereof.

The term "site temperature information" as used herein, refers to analog signals received from temperature sensors recording temperature of the equipment at the site.

The term "site stress information" as used herein refers to analog signals received from stress sensors recording pounds per square inch (psi) of the equipment at the site.

The term "site well information" as used herein refers to information describing the well being drilled, by hydrocarbon formation, depth, rate of penetration, name of the well, location of the well and other identifying information.

For example, sensor data received from a site can be combined with the site's digital and control configuration data to determine which controls may have changed states. The derived control state information can be stored in the administrative database. The derived control state information can be combined with the sites control valve configuration information to determine which valves were cycled as a result of the control state change. The control valve cycle information can be stored in the administrative database.

In an embodiment, the site data can include control state data, control cycle data, control valve data, pressure data, temperature data, stress data, well data pneumatic or hydraulic flow rates, pneumatic or hydraulic flow volumes, or combinations thereof.

The administrative data storage can have computer instructions for presenting at least one control state to the user, computer instructions for presenting at least one pressure to the user, computer instructions for presenting at least one valve cycle to the user, computer instructions for presenting flow information to the user, computer instructions for presenting at least one temperature to the user, computer instructions for presenting at least one stress value to the user, computer instructions for presenting well information to the user, and computer instructions for presenting at least one control cycle to the user.

In an embodiment, the computer instructions for presenting at least one control state to the user by pushing the page to a user client device after being computed by the administrative server, the page can include computer instructions to present a site description, computer instructions to present a page address, or computer instructions to present a last report date and time from the site.

An example of a time stamp can be the date and time a piece of equipment made a transition to a new state on the site, when a signification voltage or current change was detected, or when a digital value change was detected.

In an embodiment, the computer instructions for presenting at least one control state to the user can include computer instructions to present a menu of reports, a presentation, a documentation, or a user administration item for selection by the user on the user client device.

In an embodiment, the computer instructions for presenting at least one control state to the user can include computer instructions to present a calendar allowing the user to select a date for viewing. In an embodiment, the calendar is by days of the month. The user can pick a date on the calendar.

In an embodiment, the computer instructions for presenting at least one control state to the user can include computer instructions enabling the user to select a time scale for viewing. A variety of time scales can be selected, such as four weeks, one week, 24 hours, 12 hours, 6 hours, 1 hour, or some other time scale. Additional computer instructions can provide tic marks on a resulting chart enabling a visual subdivision of the time scale.

Additional computer instructions can be provided enabling the production of a time scale report for selected control. The time scale report can include a name of site equipment, a state of a control selected at the site during a selected time scale, visual indicator which indicate different states of the control during the selected time scale.

The indicators can be colors that are coded for each state of the control. The states of the control can include (i) unknown state; (ii) block or vent state, (iii) open state, or (iv) closed state. The unknown state can be blue, the block or vent state can be yellow, the open state can be green, and the closed state can be red for easy viewing to quickly stop damage or act promptly on the equipment. Other color to control state associations can be possible, but this depends on the site and the type of equipment being monitored.

In an embodiment, the computer instructions for presenting at least one control state to the user can include computer instructions enabling the user to select a control or a group of controls for viewing. A control or a group of controls for viewing can include blowout preventer controls, such as an upper annular preventer or a lower annular preventer. Other controls can include an upper ram, a middle ram, a lower ram, various choke and kill lines, a riser connector, a wellhead connector, or combinations thereof.

In an embodiment, the computer instructions for presenting at least one control state to the user can include computer instructions enabling the user to clear a list of at least one control. For example, the upper annular control and the lower annular control can be checked. The user can then click the "clear" button and view the choke and kill line controls instead.

In an embodiment, the computer instructions for presenting at least one control state to the user can include computer instructions enabling the user to refresh at least one item presented to the user that is a time based item. An example of an item that is a time-based item can be the state of a blowout preventer ram or an annular control.

In an embodiment, the computer instructions for presenting at least one control state to the user can include computer instructions enabling the user to view an identifier for the site being monitored. An identifier can be an alpha code, a numeric code, a bar code, a photograph, a diagram, a schematic, a name, or combinations thereof.

In an embodiment, the computer instructions for presenting at least one control state to the user can include computer instructions for presenting a time stamp to the user indicating when information to a requested status response was provided to the administrative server from the site processor.

In an embodiment, the computer instructions for presenting at least one control state to the user can include computer instructions for allowing the user to shift the time scale. These computer instructions allow the user to shift a time scale 2 hours later, 2 hours earlier, 4 hours later, 4 hours earlier, 24 hours later, 24 hours earlier, or other combinations thereof of time shifts.

In an embodiment, the computer instructions for presenting at least one control state to the user can include computer instructions for providing a start date and time for a chart requested by the user.

In an embodiment, the computer instructions for presenting at least one control state to the user can include computer instructions for providing a chart legend to the user for the chart. A chart legend can include the color, such as red, green, yellow, blue, black, gray, or other color used to represent each control state for each control. For example, the color green can be used to indicate that a blowout preventer ram is open, and red can be used to indicate that the blowout preventer ram is closed.

In an embodiment, the computer instructions for presenting at least one control state to the user can include computer instructions providing a time code for a chart start date and time, a chart midpoint time, and a chart end date and time, or combinations thereof.

In an embodiment, the computer instructions for presenting at least one control state to the user client device can include computer instructions to provide a time scale report for a selected control using color.

In an embodiment, the computer instructions for presenting at least one pressure data to the user client device can include computer instructions to present a site description, such as a photo, a name or another type of identifier.

In an embodiment, the computer instructions for presenting at least one pressure data to the user can include computer instructions to indicate a page address to the user to indicate which report, presentation, or web page is visible to the user.

The administrative website can use a page address, or a page description, to give the user a hint of where the user is located within the website.

In an embodiment, the computer instructions for presenting at least one pressure data to the user can include computer instructions to present a last report date and time from the site, computer instructions to present a menu of reports, a presentation, a documentation, and the user administration item for selection by the user, or computer instructions to present a calendar allowing the user to select a date for viewing.

In an embodiment, the computer instructions for presenting at least one pressure data to the user can include computer instructions to enable the user to clear a list of at least one pressure type, computer instructions enabling the user to select a time scale for viewing, computer instructions to enable the user to select at least one pressure type for viewing, computer instructions for presenting a type of pressure, or computer instructions to enable the user to refresh at least one item presented to the user that is a time based item In an embodiment, the computer instructions for presenting at least one pressure data to the user can include computer instructions to enable the user to view an identifier for the site being monitored, computer instructions for presenting a time stamp to the user indicating when information to a requested response was provided to the administrative server from the site processor, computer instructions for presenting a pressure scale to the user, computer instructions for allowing the user to shift the time scale, or computer instructions for presenting a hyperlink to a detailed pressure change report, computer instructions for providing a start date and time for a chart requested by the user.

The computer instructions for presenting at least one pressure data to the user can include computer instructions to provide a state change for each control related to the pressure change. For example, opening the upper annular control will correlate with changes in both the pilot pressure and the accumulator pressure.

In an embodiment, the computer instructions for presenting at least one valve cycle to the user can include computer instructions to present a site description. The site description can be a name, an address, a code, a picture or combinations thereof.

In an embodiment, the computer instructions for presenting at least one valve cycle to the user can include computer instructions to indicate a page address to the user to indicate which report, presentation or web page is visible to the user. The page address can be an address, a page number within the presentation of pressure data or within the presentation of cycles to the user.

In an embodiment, the computer instructions for presenting at least one valve cycle to the user can include computer instructions to present a last report date and time from the site.

In an embodiment, the computer instructions for presenting at least one valve cycle to the user can include computer instructions to present a menu of reports, a presentation, documentation, or user administration items for selection by the user.

In an embodiment, the computer instructions for presenting at least one valve cycle to the user can include computer instructions to enable the user to select a control or a group of controls for viewing, computer instructions to enable the user to clear a list of at least one control, or computer instructions to enable the user to refresh at least one item presented to the user that is a time based item.

In an embodiment, the computer instructions for presenting at least one valve cycle to the user can include computer instructions to enable the user to view an identifier for the site being monitored. The identifier can be an alpha code, a numeric code, a bar code, a photograph, a diagram, a schematic, or combinations thereof.

In an embodiment, the computer instructions for presenting at least one valve cycle to the user can include computer instructions for presenting a time stamp to the user indicating when information to a requested response was provided to the administrative server from the site processor, or computer instructions to provide a name of a control to the control cycle report with an additional hyperlink to an additional report.

In an embodiment, the computer instructions for presenting at least one valve cycle to the user can include computer instructions for providing a location for each control or each valve. The location can identify a physical location of the control or the valve at a site.

In an embodiment, the computer instructions for presenting at least one valve cycle to the user can include computer instructions for providing a number of cycles that each control or each valve experienced.

In an embodiment, the computer instructions for presenting at least one valve cycle to the user can include computer instructions to provide a valve type, computer instructions to provide the function of a control or valve, computer instructions to provide a cycle count maximum, or computer instructions to provide a percent of current cycle count compared to a cycle count maximum.

A detail of a selected control can be provided, such as the number of times a blowout preventer ram was opened or closed, or the number of times the selected control's shuttle valve was cycled can be shown.

The name of a control can be provided on the control cycle report with a hyperlink to additional reports.

The method uses at least one user client device in communication with the administrative server. The user client device can have the user display, the user processor, or the user data storage in communication with the user processor.

In an embodiment, the administrative data storage can include computer instructions for allowing the user to reset a cycle count for a valve or a control, computer instructions for allowing the user to enter a count number from which to initiate a count, computer instructions to display the current cycle count of a control or a valve, computer instructions to save cycle information, or computer instructions enabling the user to return to a previous screen without saving.

In an embodiment, the administrative data storage can include computer instructions for allowing the user to reset the number of days in service for a control or valve, computer instructions for allowing the user to enter a number of days in service to initialize the days in service, computer instructions to display the current number of days in service of a control or valve for equipment on a site, computer instructions to save the number of days in service information, or computer instructions enabling the user to return to a previous screen without saving.

In an embodiment, the administrative data storage can include computer instructions for allowing the user to input information about the manufacturer, the serial number, the maximum allowed cycles, the maximum days in service, and other information for a control or valve, computer instructions to save the information, or computer instructions enabling the user to return to a previous screen without saving.

In an embodiment, the administrative data storage can include computer instructions to provide a control or valve description, computer instructions for allowing the user to see a visual schematic to select a valve for resetting a cycle count, computer instructions for allowing the user to input a description indicating a reason for resetting a valve or cycle count, or computer instructions to present a calendar allowing the user to select a date.

In an embodiment, the computer instructions for presenting at least one pressure change to the user can include computer instructions for selecting a pressure change detail, or computer instructions to clear a list of pressure changes.

In an embodiment, the computer instructions for presenting at least one pressure change to the user can include computer instructions for enabling the user to refresh at least one item presented to the user that is a time based item.

In an embodiment, the computer instructions for presenting at least one pressure change to the user can include computer instructions to generate a time dependent pressure detail chart. The time dependent pressure detail chart can include a profile parameter of a time duration and a pressure change during the pressure transition. The time duration can be from 30 seconds to 5 minutes on a fine time scale, such as a sampling rate of once every 100 milliseconds.

In an embodiment, the computer instructions for presenting at least one pressure change to the user can include computer instructions for presenting all pressures during any pressure transition. An example of this can include pressure changes for the pilot pressure, the accumulator pressure, and the rig air pressure.

The computer instructions to generate a time dependent pressure detail chart can include computer instructions for generating a title with time and date of a selected pressure change, computer instructions for presenting a pressure scale, or computer instructions for presenting a change in time, a change in pressure, or combinations thereof to characterize the pressure transition.

The computer instructions to generate a time dependent pressure detail chart can include a time scale, or a pressure legend.

In an embodiment, the computer instructions for presenting at least one pressure change to the user can include computer instructions for presenting a pressure to the user. The pressure can be determined on a time versus pressure scale by name of pressure type.

In an embodiment, the computer instructions for presenting at least one pressure change to the user can include computer instructions for presenting all pressures during any pressure transition, computer instructions for presenting a type of pressure, computer instructions for presenting a pressure scale to the user, computer instructions for presenting a start and end time scale, or computer instructions for providing a start date and time for a chart requested by the user.

In an embodiment, the computer instructions for presenting at least one pressure change to the user can include computer instructions for providing a time scale different from the start and end time scale, or computer instructions for presenting a pressure legend.

In an embodiment, the computer instructions for presenting control and valve cycle counts summarized on a daily basis to the user can include computer instructions to present a site description, such as a photo, or a name or another type of identifier, to help the user identify the site being monitored.

In an embodiment, the computer instructions presenting control and valve cycle counts summarized on a daily basis to the user can include computer instructions to indicate a page address, or a page description, to give the user a hint of where the user is located within the website.

In an embodiment, the computer instructions for presenting control and valve cycle counts summarized on a daily basis to the user can include computer instructions to present a time stamp to the user indicating when information to a requested response was provided to the administrative server from the site processor, computer instructions to present a menu of reports, presentations, documentation, and user administrative item for selection by the user, computer instructions to present a calendar allowing the user to select a starting date for viewing information, or computer instructions to present a list of time intervals allowing the user to select an interval for viewing information.

In an embodiment, the computer instructions for presenting control and valve cycles counts summarized on a daily basis to the user can include computer instructions to present a date indicating when the cycles occurred, computer instructions to present the number of open cycles, computer instruction to present the number of block cycles, computer instructions to present the number of close cycles, computer instructions to allow the user to exclude the cycle counts for selected days from the total number of cycles, computer instructions to allow the user to refresh the daily cycle count report, or computer instructions to allow the user to update the excluded cycle counts for selected days.

In an embodiment, the computer instructions for presenting at least one hydraulic or pneumatic flow volume or at least one hydraulic or pneumatic flow rate for equipment on a site to the user can include computer instructions to present a site description, such as a photo, or a name or another type of identifier, to help the user identify the site being monitored.

In an embodiment, the computer instructions for presenting at least one hydraulic or pneumatic flow volume or flow rate to the user can include computer instructions to indicate a page address, or a page description, to give the user a hint of where the user is located within the website.

In an embodiment, the computer instructions for presenting at least one hydraulic or pneumatic flow volume or flow rate to the user can include computer instructions to present a time stamp to the user indicating when information to a requested response was provided to the administrative server from the site processor, computer instructions to present a menu of reports, presentations, documentation, and user administrative item for selection by the user, computer instructions to present a calendar allowing the user to select a starting date for viewing information, or computer instructions to present a list of time intervals allowing the user to select an interval for viewing information.

In an embodiment, the computer instructions for presenting at least one hydraulic or pneumatic flow volume or flow rate to the user can include computer instructions to enable the user to clear a list of at least one flow, computer instructions enabling the user to select at least one hydraulic or pneumatic flow for viewing, or computer instructions to enable the user to refresh at least one item presented to the user.

In an embodiment, the computer instructions for presenting at least one hydraulic or pneumatic flow volume or flow rate to the user can include computer instructions for presenting a description or name of the flow being viewed, computer instructions presenting a time stamp for when the flow occurred, computer instructions for presenting the flow volume, computer instructions for presenting the flow rate, computer instructions for identifying the equipment function associated with the flow, or computer instructions for presenting a hyperlink to more detailed flow volume and flow rate information, graphs and reports.

In an embodiment, the computer instructions for presenting at least one hydraulic or pneumatic flow volume or flow rate to the user can include computer instructions for presenting a graph of flow volume and flow rate versus time, computer instructions for presenting a title indicating the date and time the flow occurred, computer instructions for presenting a flow volume scale to the user, computer instructions for presenting a flow rate scale to the user, computer instruction for presenting a time scale to the user, or computer instructions for presenting a legend for the flow volume and flow rate graph.

In an embodiment, the administrative data storage can have computer instructions to present a calendar allowing the user to select a date for viewing, computer instructions enabling the user to select a time scale for viewing, computer instructions for allowing the user to shift the time scale, computer instructions for providing a start date and time for a chart requested by the user, computer instructions for generating a start date and time of a control state interval, or computer instructions for generating an end date and time of a control state.

In an embodiment, the administrative data storage can have computer instructions for generating an indicator by color, or computer instructions for presenting a time duration of a control state interval.

Turning now to the Figures, FIG. 1 is a diagram of equipment usable by the method.

The method can be operated for a site 6, such as an offshore oil rig. The site can be a plant, or another facility that utilizes multiple controls, multiple pressures or multiple valves.

The site can include site equipment 11, such as valves 7. Sensors 10 can be attached to the site equipment.

The sensor data 9 from the sensors 10 can be transferred from the sensors to the data acquisition hardware 8.

The data acquisition hardware 8 can be connected to a data acquisition power supply 12.

A plurality of data signals 13a from the data acquisition hardware 8 can be transferred by wireless connection or wired connection to a site processor 14. The site processor 14 can be connected to a site power supply 15. The site processor 14 can be in communication with a site data storage 16.

The site processor 14 can transfer a plurality of data signals 13b over a network 19 and to an administrative server 50. The administrative server 50 can have an administrative processor 52 and an administrative data storage 54 in communication with the administrative processor. The administrative server can be a laptop, desktop computer, tablet computer, smart phone, or remote terminal unit.

The administrative server can be in communication with one or more user client devices 58a, 58b over the network.

The user client devices 58a, 58b can each have a user display 59a, 59b, in communication with a user processor 60a, 60b and a user data storage 62a, 62b.

FIG. 2 is a diagram of the computer instructions within the site data storage 16. The computer instructions in the site data storage can include a site process monitor 38, a digital input monitor 20, an analog input monitor 24, a data transfer device 28, an analog detail monitor 45, and a site task device 31.

The site data storage 16 can include computer instructions 42 for creating and storing at least one report from the digital input monitor, the analog input monitor, the data transfer device, the site task device, the site process monitor and the analog detail monitor.

The site data storage can include computer instructions 44 for creating and storing at least one message on the digital input monitor, the analog input monitor, the data transfer device, the site task device, the site process monitor and the analog detail monitor.

The site data storage can include computer instructions 18 to form a site database which is used to store at least one digital signal, at least one analog signal, at least one message, at least one report and combinations thereof.

The site data storage can include a plurality of configuration libraries 63. The configuration libraries can include a digital input monitor configuration library 64, an analog input monitor configuration library 65, a site task device configuration library 66, a data transfer device configuration library 67, an analog detail monitor configuration library 68, and a site process monitor configuration library 69.

Examples of the information in these libraries can include the software driver associated with the data acquisition hardware, the database connection information, the hardware polling cycle, the masks to indicate unused control bits or analog I/O channels, control bits associated with a power-on, a lamp test, or an alarm.

The site data storage can include site web server computer instructions, such as computer instructions 70 for creating a web server at the site and computer instructions 71 to receive a request for status of the site processor.

The site data storage can also include computer instructions 72 for responding to a request for status of the site processor.

FIG. 3 is a depiction of the computer instructions within the monitors and devices of the site data storage 16.

The site data storage 16 can include a digital input monitor 20. The digital input monitor can include computer instructions 21 for receiving digital signals from the data acquisition equipment. The digital input monitor can have computer instructions 22 for comparing digital sensor data to previous data, previously stored data, a set of rules, to determine if a change in a digital signal occurs and then to store the compared data. A change in a digital signal refers to a change in an equipment state as indicated by a solenoid, a pressure switch, or other digital signal.

The digital input monitor 20 can include computer instructions 23 to store digital signals without making a comparison to other digital signals from the data acquisition equipment after a preset number of cycles. A preset number of cycles can be 25 cycles, for example.

The analog input monitor 24 can include computer instructions 25 for receiving analog sensor data from the data acquisition equipment, such as voltage or current associated with at least one analog signal.

The analog input monitor can have computer instructions 26 to compare analog signals to determine if a change in an analog data occurs. The comparison is made to previously stored data, or a set of stored rules. Once the comparison is made, if a difference occurs, the data is then stored. These computer instructions can operate for example, by comparing the voltage or current from the current reading with the voltage or current from the previous readings.

The analog input monitor can have computer instructions 27 to store an analog signal after a preset number of cycles without making a comparison, even if the change in reading is below a change threshold.

The site data storage can include a data transfer device 28.

The data transfer device 28 can have computer instructions 29 for transmitting any sensor data stored by the digital input monitor, the analog detail monitor, or the analog input monitor.

The data transfer device can have computer instructions 43 for transmitting at least one report or at least one message for all of the programs running on the site processor to the administrative server.

The data transfer device can have computer instructions 30 to verify the transmission of sensor data, the at least one report, or the at least one message is complete or successful.

The data transfer device can have computer instructions 40 for marking the sensor data, the at least one report, or the at least one message as transferred to the administrative server. The sensor data, the at least one report, or the at least one message can be marked with a transfer indicator to reflect if the data item has been successfully transferred or if it still needs to be transferred.

The site data storage can include a site process monitor 38.

The site process monitor 28 can have computer instructions 41 to monitor status of the digital input monitor, the analog input monitor, the data transfer device, the site task device, and the analog detail monitor.

The site data storage can include a site task device 31.

The site task device 31 can include computer instructions 34 to generate a report, such as on disc utilization.

The site task device can include computer instructions 35 to execute commands to perform maintenance tasks on the site processor.

The site task device can have computer instructions 36 to execute maintenance activities, such as to perform another computer system maintenance activity.

The method creates an analog detail monitor 45 in the site data storage. The analog detail monitor can include computer instructions 47 to receive and store analog detail data.

The analog detail monitor can monitor sensor data on a rapid data sampling cycle and continuously save the sensor data to a data buffer. When the analog detail monitor detects a significant change in either voltage or current, additional data can be added to the buffer until a full window of data has been collected. When a complete window of data has been collected, it can be saved to the database.

The site data storage can include an analog flow monitor 46 including computer instructions to receive and store flow rate and flow volume data.

The term "analog flow monitor" refers to computer instructions for collecting analog data from a flow sensor, and analyzing the analog sensor data to determine when a significant change in flow rate occurs, and then storing the analyzed sensor data.

FIG. 4 is a diagram of the computer instructions within the administrative data storage 54.

The administrative data storage 54 can include computer instructions 76 to perform the steps of an administrative process monitor. The term "administrative process monitor" refers to computer instructions that monitor processes running on the administrative server.

The administrative data storage can have computer instructions 78 to monitor a plurality of specific offshore or onshore drilling sites simultaneously. For example, these computer instructions can monitor a tension leg platform and a semisubmersible drilling rig simultaneously.

The administrative data storage can have computer instructions 80 to perform the steps of an administrative task device.

As used herein, the term "administrative task device" includes computer instructions in the administrative data storage to generate a report on disk utilization, as well as computer instructions in the administrative data storage to execute an operating system utility command, or computer instructions in the administrative data storage to perform another computer system maintenance activity. Another computer system maintenance activity can create a list of the programs running on the administrative server. The list can include the memory and central processor utilization for each program running on the administrative server.

The administrative data storage can have computer instructions 82 that create an administrative task transfer device.

As used herein, the term "administrative task transfer device" refers to computer instructions in the administrative data storage to transmit task instructions stored in the administrative data storage for storage in the site data storage.

The administrative task transfer device can have computer instructions in the administrative data storage to verify a transfer of the task instructions and to mark the task instructions as being transferred.

A plurality of administrative configuration libraries 83 can be stored in the administrative data storage. The administrative configuration libraries can include an administrative process monitor configuration library 84, an administrative site monitor configuration library 86, an administrative task device configuration library 88, and an administrative task transfer device configuration library 90.

The administrative data storage can include computer instructions 92 for forming an administrative database. The administrative database can store information from a site or a plurality of sites such as via a network, which can be a satellite network, the Internet, a cellular network, another wireless network, or combinations of networks.

The administrative data storage can include administrative web server computer instructions, such as computer instructions 93 to receive and store status information transmitted over the network from a plurality of sites. The received information can be stored in the administrative data storage.

The administrative data storage can include web server computer instructions, such as computer instructions 110 to receive, verify, and store sensor data from a site.

The administrative data storage can also include computer instructions 112 for presenting at least one control state to a user; computer instructions 114 for presenting pressure data to the user; computer instructions 116 for presenting valve cycles to the user; computer instructions 223 for presenting control cycles to the user; computer instructions 226 for presenting flow data to a user, wherein the flow data is at least one pneumatic or hydraulic flow volume or at least one pneumatic or hydraulic flow rate; and computer instructions 232 for presenting days in service for valves and controls to a user.

The administrative data storage can include computer instructions 89 for sending a request for status and computer instructions 91 for receiving a response to a request for status.

The administrative data storage can include web server computer instructions, such as computer instructions 111 for combining a plurality of site signals with site configuration information to generate site data for the plurality of equipment at the site.

The administrative data storage can also include computer instructions 234 to enable a user to clear a display; computer instructions 271 to allow the user to reset the number of days in service for each control or valve; computer instructions 273 to enter and display a plurality of current days in service of each control or valve; computer instructions 275 to enter and display a maximum allowed days in service; computer instructions 276 to calculate and display a current percentage of maximum days in service; and computer instructions 277 to enter and display control or valve manufacturing information, such as manufacturer name, serial number, maximum allowed cycles, and maximum number of days in service.

FIG. 5 is a diagram of components within the administrative database. The administrative database 92 can contain a plurality of site signals 97, site configuration information 106 and site data 125 for the plurality of equipment at the site.

The plurality of site signals 97 can include at least one digital signal 95, at least one analog signal 96. The administrative data storage can store at least one message 98, and at least one report 100.

The site configuration information 106 can include site information 101, control information 102, pressure information 103, control valve information 108, pneumatic or hydraulic flow volume or flow rate information 228, user security information 107, stress information 733, temperature information 734, and well information 735.

The site data 125 can include at least one control state data 105, at least one control cycle data 113, at least one control valve data 109, at least one pneumatic or hydraulic flow volume or flow rate 751, and at least one pressure data 115.

The site data 125 can also include temperature data 730 from the site, stress data 731 from the site, well data 732 from the site, and pneumatic or hydraulic flow volumes 752.

The method can include combining the site configuration information with the plurality of site signals to generate site data for equipment at the site.

The generation of site data can include the generation of temperature data from the site, the generation of stress data from the site and the generation of well data from the site. The generation of site data can also include the generation of pneumatic or hydraulic flow volumes.

Figure 6:
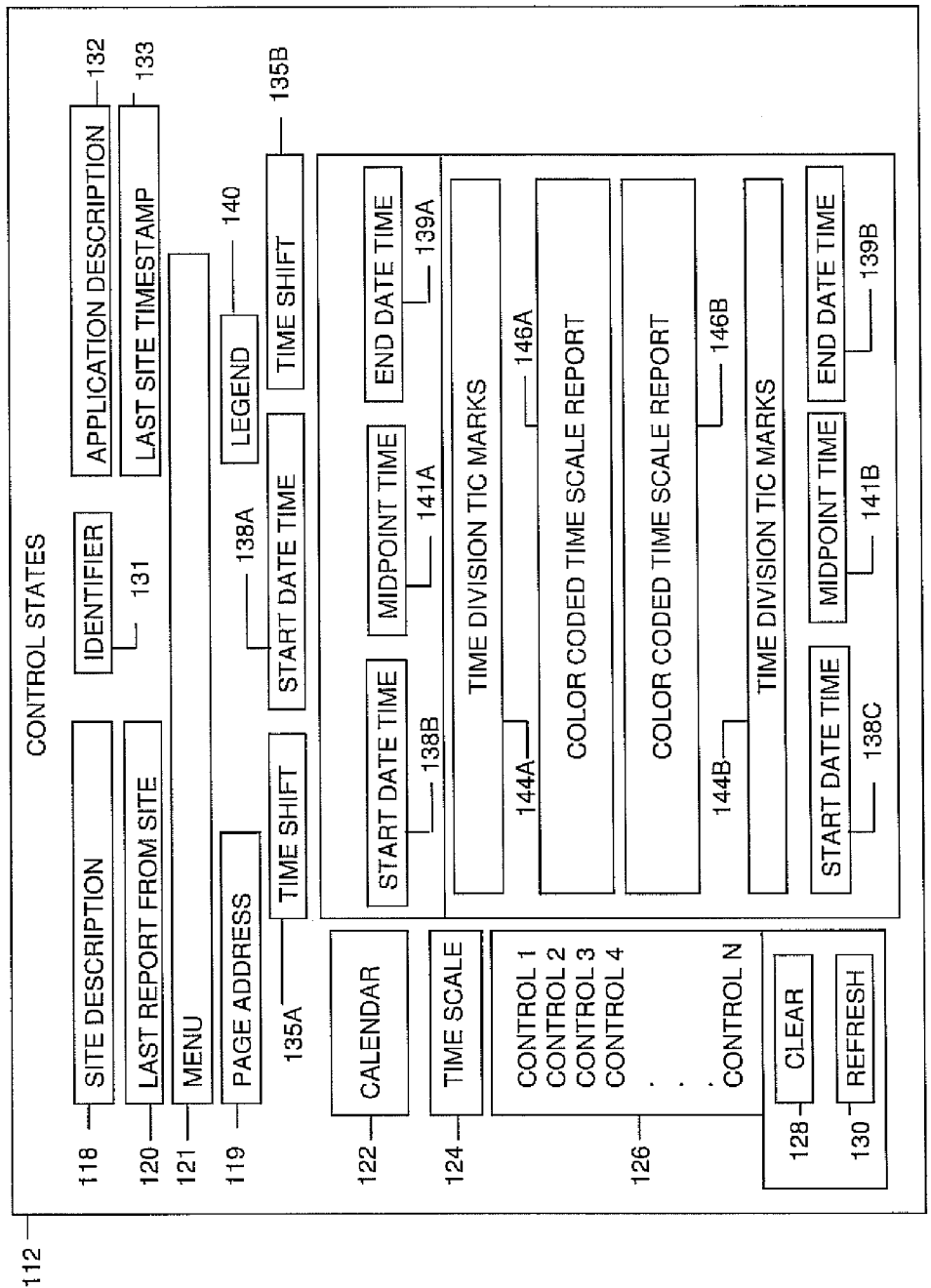
FIG. 6 depicts a page generated by computer instructions operated by the method that enables presenting a plurality of control states to a user client device.

FIG. 6 depicts a page generated by computer instructions 112 for presenting at least one control state to the user.

The computer instructions can present a site description 118, such as an address of the facility being monitored, a page address 119 to the user as the page occurs within the website; a last report from site 120, which can be a date and time; and/or a menu 121 of reports, presentations, documentation or user administration for selection by the user.

The computer instructions can present an identifier 131 for the site being monitored, the application description 132, and a time stamp 133 indicating when information to a requested response was provided to the administrative server from the site processor.

The computer instructions can present a calendar 122 for allowing the user to select a date for viewing control states, and a time scale 124 for enabling the user to select a time scale for viewing control states.

The page can be generated using computer instructions for selecting an individual or a group of controls 126 for viewing, computer present a clear button 128 to activate by a user to clear control choices, computer instructions for enabling the user to refresh at least one item presented to the user that is a time based item using a refresh button 130, computer instructions for allowing the user to shift the time scale using time shifts 135a and 135b, computer instructions to provide a start date and time 138a, and computer instructions to provide a legend 140 to the user for understanding any charts generated.

The computer instructions can provide multiple time scale reports/charts, each report/chart having a start date time 138b, 138c; a midpoint time 141a, 141b; an end date time 139a, 139b; and time division tic marks 144a, 144b.

The page can be generated using computer instructions to provide a color coded time scale report 146a, 146b for selected controls including a name of site equipment from which monitoring data is obtained, a state of the control during a selected time scale, a visual indicator to indicate each different state for the control during the selected time scale. For example, green can represent open, red can represent closed, yellow can be unknown, or blue can be block or vent.

Figure 7:
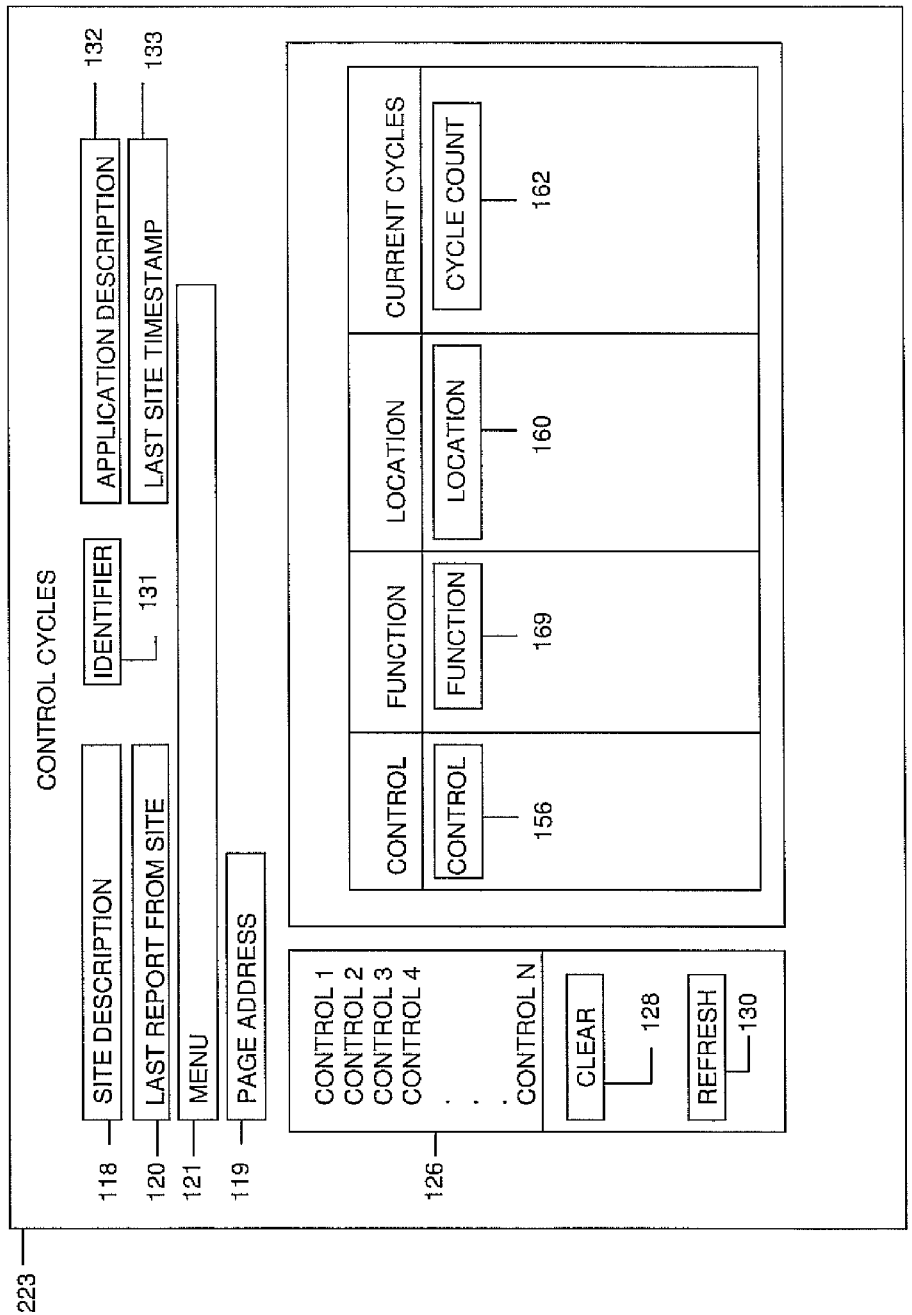
FIG. 7 depicts a page generated by computer instructions for presenting a plurality of control cycles as pushed to a user client device.

FIG. 7 is a page generated by computer instructions 223 for presenting a plurality of control cycles to the user. Computer instructions to generate the page can include computer instructions to present a site description 118, such as an address of the facility being monitored.

The page can be generated using computer instructions to indicate a page address 119 to the user as the page occurs within the website, computer instructions to present a last report date and time from site 120, and computer instructions to present a menu 121 of reports, presentations, documentation, user administration for selection by the user.

The page can be generated using computer instructions for selecting an individual or a group of controls 126 for viewing, and computer instructions for allowing the user to clear a list of selected individual controls or groups of controls using a clear button 128.

The page can be generated using computer instructions for enabling the user to refresh at least one item presented to the user that is a time based item using a refresh button 130, computer instructions presenting an identifier 131 for the site being monitored, computer instructions presenting an application description 132, and computer instructions to present a time stamp 133 to the user indicating when information to a requested response was provided to the administrative server from the site processor.

The page can be generated using computer instructions to provide a name 156 of a control to be contained in a control cycle report with a hyperlink to additional reports, an identification of the function 169 of a selected control, a location 160 for each selected control, and a cycle count 162. The cycle count can be the number of cycles each control has undergone.

Figure 8:
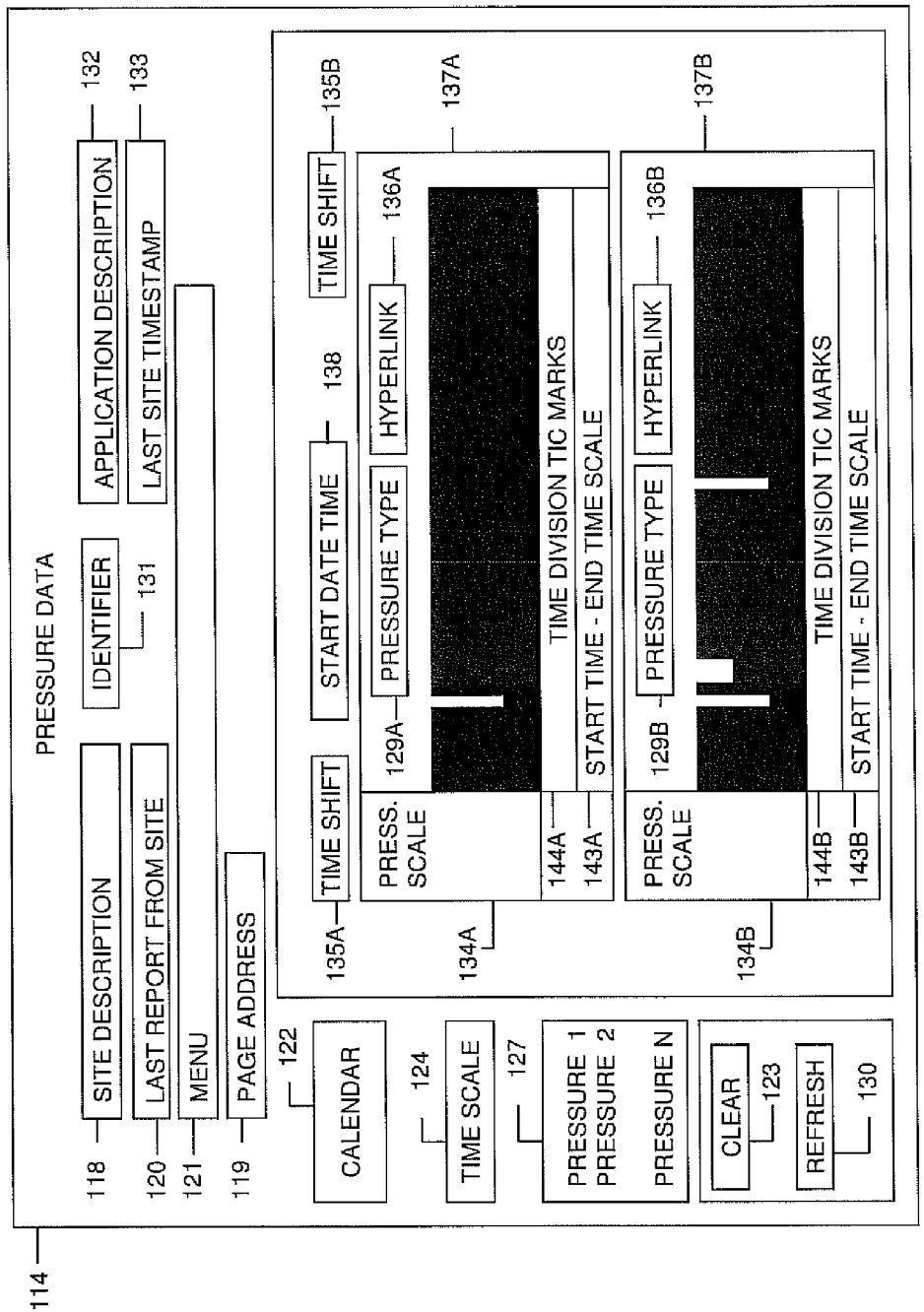
FIG. 8 depicts a page generated by computer instructions for presenting pressure data as pushed to a user client device.

FIG. 8 is a page generated by computer instructions 114 for presenting pressure data to a user. The page can be generated using computer instructions to generate a site description 118, a site identifier 131, an application description 132, a last site time stamp 133, a last report date from site 120, and a menu 121.

The pressure change detail page can indicate a page address 119 to the user as the page occurs within the website.

The page can be generated using computer instructions to present a calendar 122 allowing the user to select a date for viewing a pressure, computer instructions enabling the user to select a time scale 124 for viewing a pressure, computer instructions for selecting an individual pressure or a group of pressures 127 for viewing, computer instructions allowing the user to clear a list of a selected individual pressures or a selected group of pressures using a clear button 123, and computer instructions for enabling the user to refresh at least one item presented to the user that is a time based item using a refresh button 130.

The page can be generated using computer instructions for presenting an identifier 131 for the site being monitored, computer instructions for presenting the application description 132, and computer instructions for presenting a time stamp 133 to the user indicating when information to a requested response was provided to the administrative server from the site processor.

The page can be generated using computer instructions for presenting pressure scales 134a and 134b for different pressures at a site, computer instructions to provide a different time shift scale control to the user allowing the user to shift the presentation backwards in time and allowing the user to shift the presentation forward in time using time shift buttons 135a and 135b.

The page can be generated using computer instructions to provide a plurality of pressure versus time charts, wherein a first pressure versus time chart 137a and a second pressure versus time chart 137b are depicted.

The computer instructions can present a pressure type 129a and 129b, a hyper link 136a and 136b, a start to end time scale 143a and 143b for each of the pressure versus time charts, and tic marks 144a and 144b to enable a visual subdivision of the time scale for each of the pressure versus time charts.

Figure 9A:
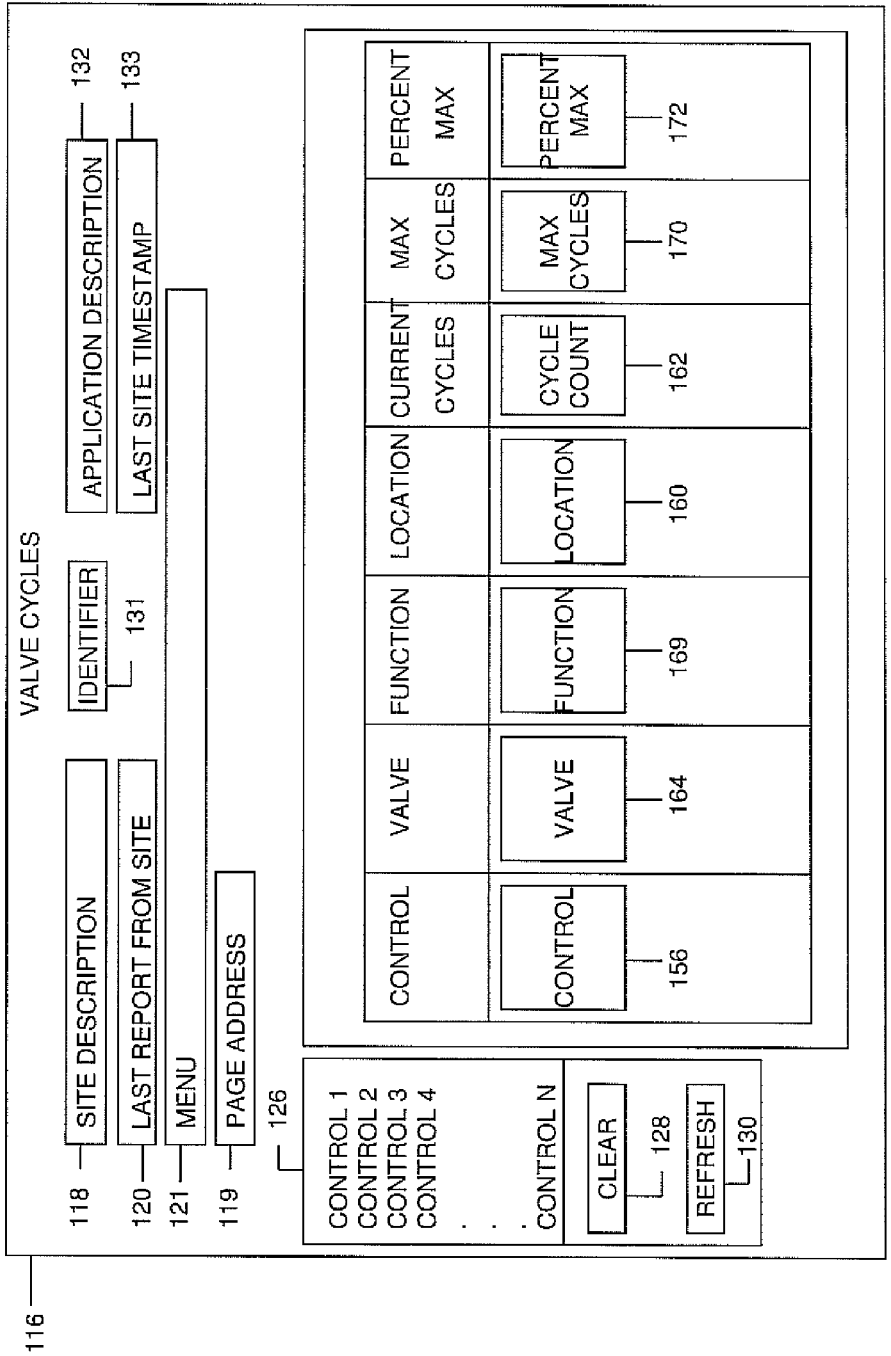
FIGS. 9A and 9B depict embodiments of pages generated by computer instructions for presenting a plurality of valve cycles pushed to a user client device.

FIG. 9A is a page generated by computer instructions 116 for presenting at least one valve cycle to a user. The page can be generated using computer instructions to generate a site description 118, a site identifier 131, an application description 132, a last site time stamp 133, a last report date from site 120, and a menu 121.

The pressure change detail page can indicate a page address 119 to the user as the page occurs within the website.

The page can be generated using computer instructions for selecting an individual or a group of controls 126 for viewing and computer instructions allowing the user to clear a list of selected individual controls or groups of controls using a clear button.

The page can be generated using computer instructions for enabling the user to use a refresh button 130 to refresh at least one item presented to the user that is a time based item.

The page can be generated using computer instructions for presenting an identifier 131 for the site being monitored, and for presenting a description 132 of the application, and a last site time stamp 133 to the user indicating when information to a requested response was provided to the administrative server from the site processor.

The page can be generated using computer instructions to provide a control name 156, a valve identification 164, such as a part number, and the function 169 of each valve or each control, as well as a location 160 of each valve or each control.

The page can be generated using computer instructions to provide a cycle count 162, such as the number of times the valve opened, and a number of times the valve closed.

The page can be generated using computer instructions to provide a cycle count maximum by valve 170 as well as computer instructions to provide a percent maximum 172 which is a percent of current cycle count compared to a maximum cycle count to the user for each valve selected.

Figure 9B:
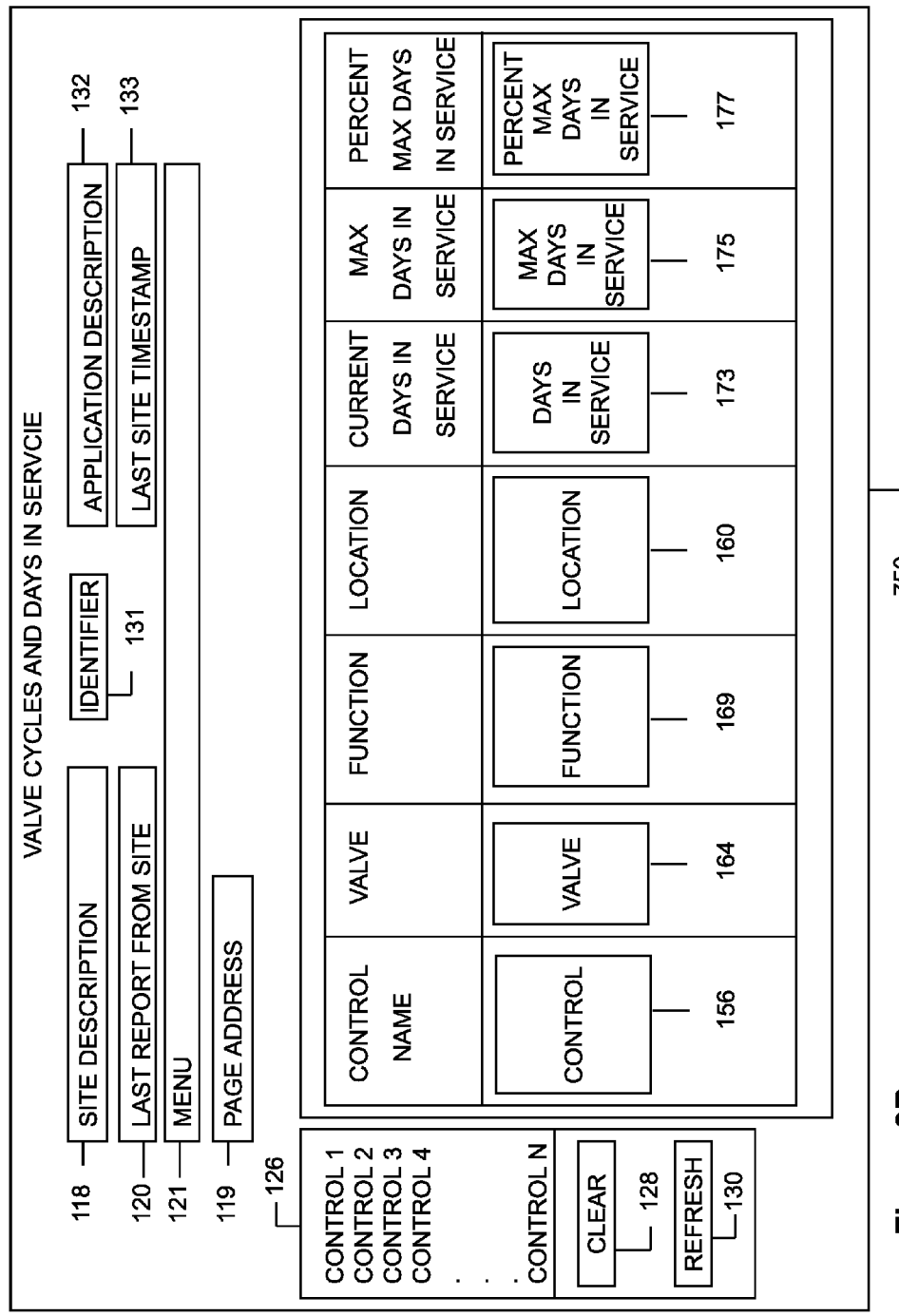

FIG. 9B depicts the page generated by computer instructions 116 for presenting at least one valve cycle to a user of FIG. 9A with the addition of computer instructions to provide a number of days in service for the valve 173, a maximum allowed number of days in service for the valve 175 and a percentage of number of days in service compared to a maximum allowed number of days in service for each valve selected 177.

Figure 10:
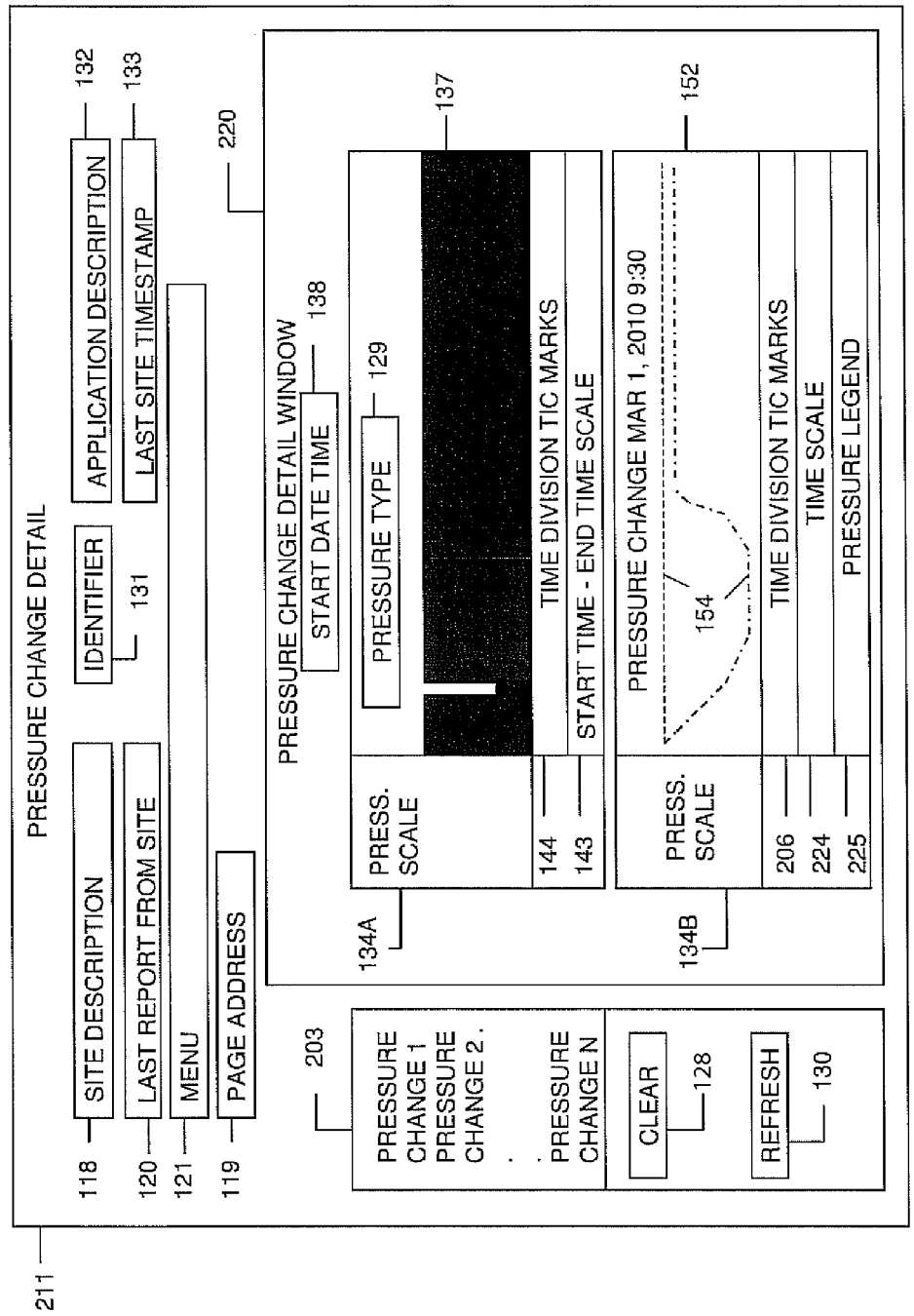
FIG. 10 depicts a pressure change detail page with a detailed 90 second view of a pressure change as created by the method and pushed to a user client device.

FIG. 10 is a pressure change detail page 211 with a detailed ninety (90) second view of a pressure change.

The pressure change detail page is produced with computer instructions 116 and uses additional computer instructions to generate a site description 118, a site identifier 131, an application description 132, a last site time stamp 133, a last report date from site 120, and a menu 121.

The pressure change detail page can indicate a page address 119 to the user as the page occurs within the website.

The pressure change detail page can be generated with computer instructions that produce a pressure change detail window 220. The pressure change detail window 220 can indicate a pressure type 129. The pressure change detail window 220 can have a pressure history graph 137, and a pressure change graph 152. The pressure history graph 137 can have a non-detailed pressure scale 134a for a non-detailed pressure graph 137 and a detailed pressure scale 134b for a detailed pressure change graph 152.

The pressure change detail window can include time division tic marks 144 for the non-detailed pressure graph and time division tic marks 206 for the detailed pressure change graph.

A start time and end time 143 for the non-detailed pressure graph is presented.

A time scale 224 can be created for the detailed pressure change graph. A pressure legend 225 can also be generated for the detailed pressure change graph.

The pressure change detail page can have a select pressure change control 203, a clear all button 128 of a list of selected individual pressure changes, and a refresh button 130 for enabling the user to refresh at least one item presented to the user that is a time based item.

Figure 11:
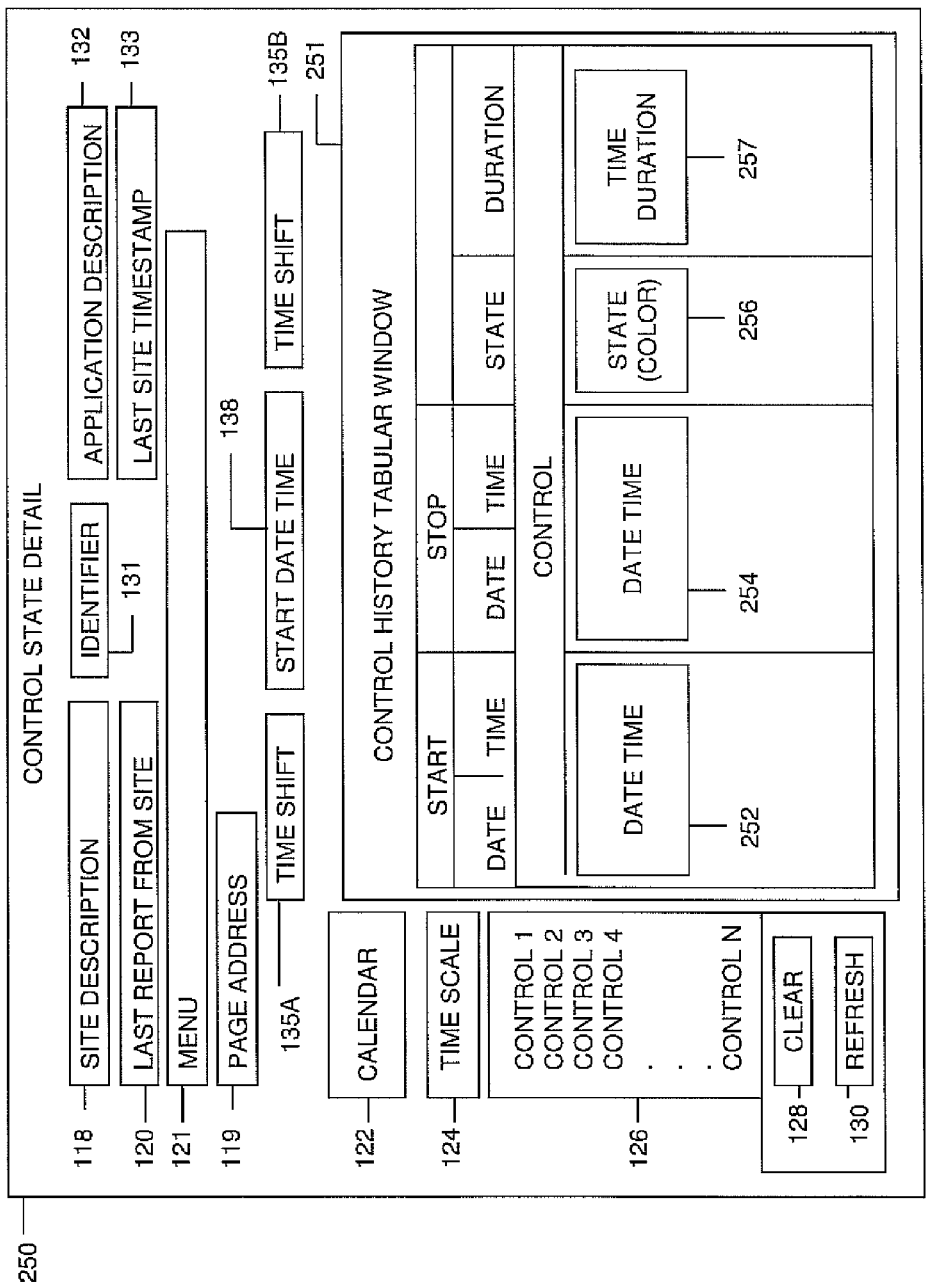
FIG. 11 depicts a control state detail page depicting the control states in more detail which the method creates and pushes to a user client device.

FIG. 11 is a control state detail page 250 produced using computer instructions 112.

The control state detail page can be generated using computer instructions to present control state detail including computer instructions to present a site description 118, such as an address of the facility being monitored; computer instructions to indicate a page address 119 to the user as the page occurs within the website; computer instructions to present a last report date and time 120 from the site; computer instructions to present a menu 121 of reports, presentations, documentation, user administration for selection by the user; computer instructions for presenting an identifier 131 for the site being monitored, and for presenting a description 132 of the application, and a last site time stamp 133 to the user indicating when information to a requested response was provided to the administrative server from the site processor.

The page can be generated using computer instructions for selecting an individual or a group of controls 126 for viewing, and computer instructions allowing the user to clear 128 a list of selected individual controls or groups of controls.

The page can be generated using computer instructions for enabling the user to use a refresh button 130 at least one item presented to the user that is a time based item.

The page can be generated using computer instructions include a calendar 122 and a time scale selector 124. The time scale selector can allow the user to select a time scale for the control state detail page.

The page can include a time shift 135a and 135b, and a start date and time 138.

The page can include a control history tabular window 251. In this displayed history is a date time 252 and 254, a state that can be colorized 256, and a time duration 257.

Figure 12:
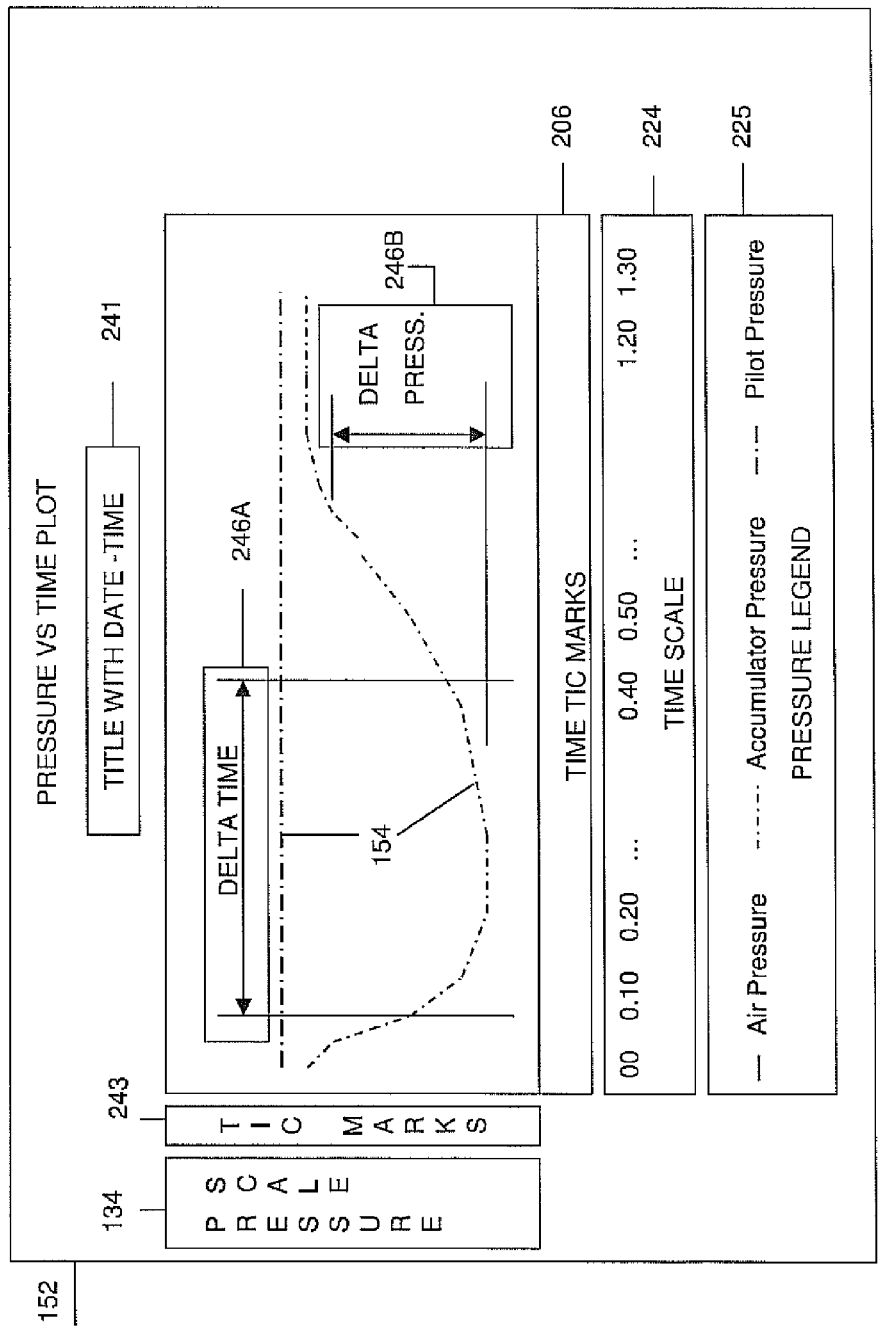
FIG. 12 depicts a pressure detail report for a 90 second interval created by the method and pushed to a user client device.

FIG. 12 is a pressure detail report for a 90 second interval.

The rig pressure detail report 152 can show the details of a pressure change over a small time window. The rig pressure detail page can have a graph of pressure versus time. The title 241 of the rig pressure detail report can indicate the date and time of the pressure change. The pressure scale 134 can be reported in pounds per square inch or another common pressure unit. The tic marks 243 can be used on the pressure scale to visually partition the scale.

The time scale of the graph 224 can be in seconds. The length of the time scale 224 can range from 30 seconds to 180 seconds or longer if required. One or more pressures 154 can be shown in the pressure versus time display.

The pressures 154 can be distinguished by using colors or different line types. A legend 225 can correlate the color or line type with the pressure.

The pressure versus time graph can characterize one or more of the pressure changes by using a profile, such as a delta time interval 246a, a delta pressure change value 246b, or combinations thereof. Time tic marks 206 can be illustrated within the pressure versus time graph.

Figure 13:
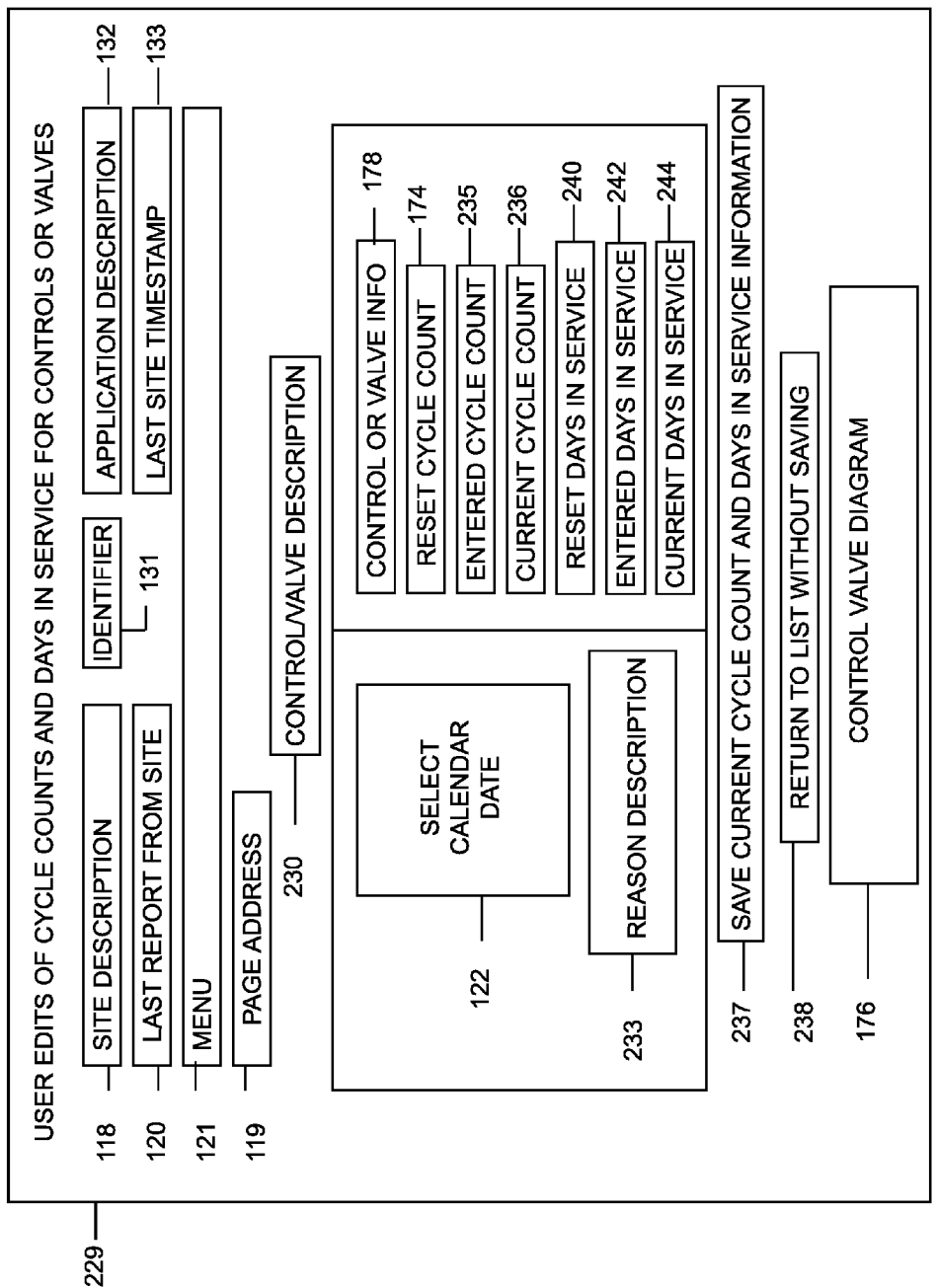
FIG. 13 depicts a page allowing a user to edit at least one cycle count for a valve cycle or control cycle as part of a maintenance record as pushed to a user client device.

FIG. 13 is a page depicting control/valve description 230 and allows the user to edit at least one cycle count for a valve cycle or control cycle, allowing the user to edit the number of days in service for a valve or control as part of a maintenance record 229.

The valve cycle or control cycle maintenance page 229 can show a control valve diagram 176 that can document the valve configuration for the selected control. The user can select a valve from the diagram and change or reset the current number of cycles. This feature can be used when a valve is replaced or has been refurbished as part of the maintenance program.

The valve cycle or control cycle maintenance page 229 can include a description of the site 118, a description of the application 132, the site identifier 131, the time stamp 120 for the last report received from the site, the last site time stamp 133 can be presented to the user to indicate when information to a requested response was provided to the administrative server from the site processor.

The valve cycle or control cycle maintenance page 229 can include a menu 121, for selecting other reports and displays and a page address 119 to help the user identify the current web page.

The valve cycle or control cycle maintenance page 229 can include a control type or valve type. The valve cycle or control cycle maintenance page 229 can include control or valve information 178, an add/cancel operation selection, a calendar date selection 122, a reason description 233, a reset cycle count selection 174, that performs as a selector and an entered cycle count 235, that is the actual value, and a current count of valve cycles 236.

The valve cycle or control cycle maintenance page 229 can include manufacturer information for the control or valve such as a manufacturer name or serial number. The manufacturer information can be edited and saved by the user.

The valve cycle or control cycle maintenance page 229 can include a reset or change number of days in service selection 240, and if a user selects to change the days of service, then a number is entered as a number of days in service 242, and the computer instructions calculate the current days in service 244.

The valve cycle or control cycle maintenance page 229 can include a save current cycle and days in service information 237 functionality, and a return to list without saving 238 functionality.

The valve cycle or control cycle maintenance page 229 can also include a control valve diagram 176.

Figure 14:
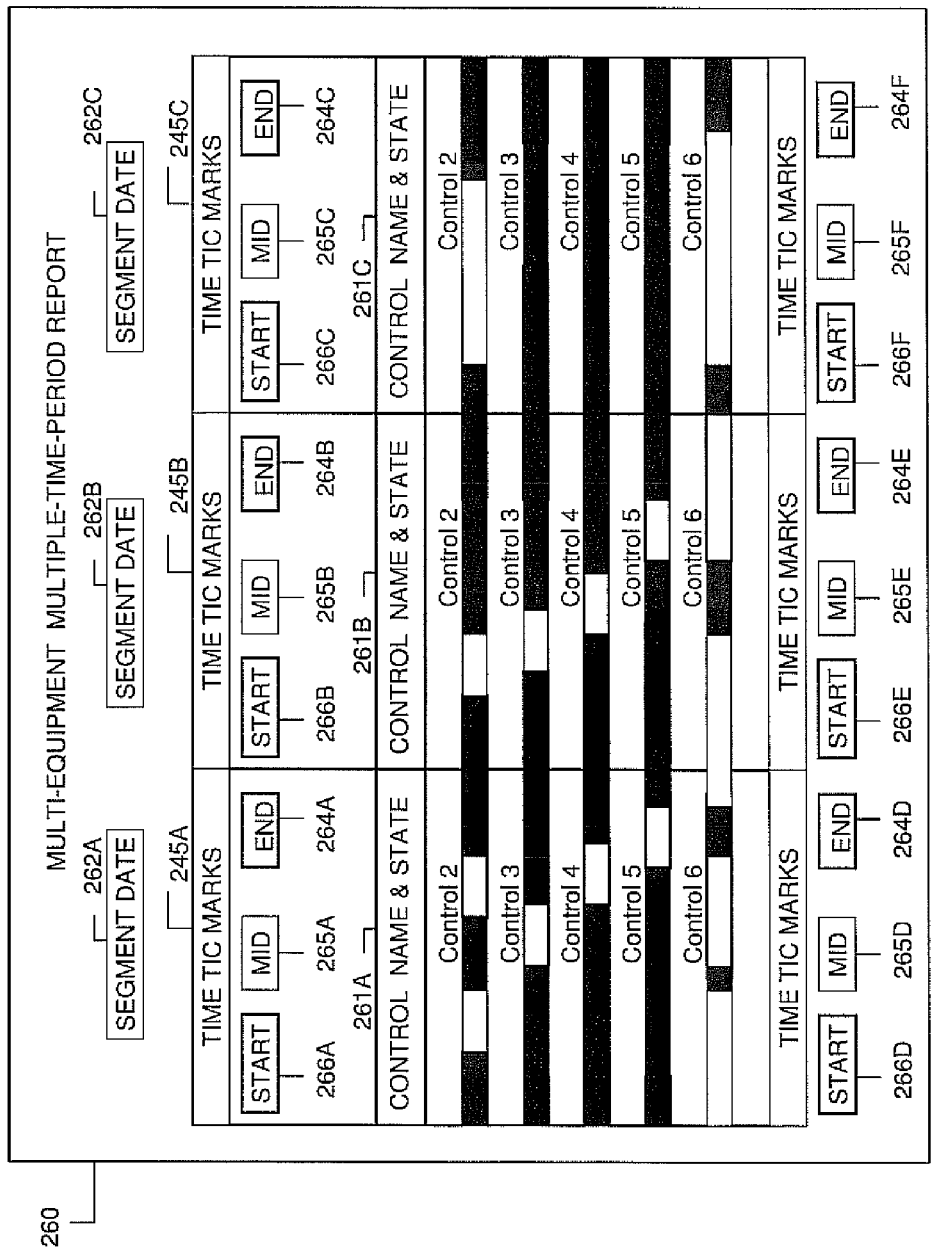
FIG. 14 is a depiction of a multi-equipment multi-time-period report as pushed to a user client device.

FIG. 14 is a depiction of a multi-equipment multi-time-period report 260 as viewable by the user. The multi-equipment multi-time-period report 260 can show multiple states of a plurality of equipment at the site, over a period of multiple days, as viewable by the user. The control state history can be viewed as a web page or as a PDF file.

The multi-equipment multi-time-period report 260 can give the user a convenient mechanism for viewing the control history, which can highlight a trend or event that occurred over several days. The control history can be generated for any number of days. For example, 5 days, 10 days, 14 days, or another appropriate interval.

The multi-equipment multi-time-period report 260 can show a plurality of control names and states 261*a*, 261*a*, 261*c*. A user can selected the number of reports and number of days for reporting and view a number of reports for several consecutive days simultaneously.

The multi-equipment multi-time-period report 260 can have segment dates 262*a*, 262*b*, 262*c*, and time tic marks 245*a*, 245*b*, 245*c*.

Each segment can have a start segment time and date 266*a*, 266*b*, 266*c* appear at the top of the page and 266*f*, 266*e*, 266*f* appear at the bottom of the page; a mid segment date and time 265*a*, 265*b*, 265*c* appear at the top of the page and 265*d*, 265*e*, 265*f* appear at the bottom of the page; and an end segment time and date 264*a*, 264*b*, 264*c* appear at the top of the page and 264*d*, 264*e*, 264*f* appear at the bottom of the page.

FIGS. 15A-15D depict the steps of the method according to the embodiments.

The method can include forming a database for sensor data in the site data storage using computer instructions in the site data storage, as shown in step 501.

The method can include installing a plurality of site configuration libraries in the site data storage, as shown in step 502.

The method can include creating a site based website in the site data storage, as shown in step 503.

The method can include receiving and storing sensor data in the site data storage from at least one sensor attached to an equipment at the site, as shown in step 504.

The method can include receiving sensor data, verifying that the sensor data has been received and storing the sensor data in the database in the site data storage, as shown in step 505.

The method can include tracking digital input using a digital input monitor, as shown in step 506.

The method can include tracking analog input using an analog input monitor, as shown in step 507.

The method can include tracking analog detail input using an analog detail monitor, as shown in step 508.

The method can include transferring the digital input, the analog input, the analog detail input or combinations thereof using a data transfer device, as shown in step 509.

The method can include using a site task device to monitor the database, to identify a specific task and to perform the specific task, as shown in step 510.

The method can include monitoring the digital input monitor, the analog input monitor, the analog detail monitor, the data transfer device and the site task device by using a site process monitor, as shown in step 511.

The method can include having the site processor receive at least one request for status from the administrative processor, as shown in step 512.

The method can include having the site processor respond to the request for status by the administrative processor, as shown in step 513.

The method can include using administrative data storage at a secondary location in communication with an administrative processor, wherein the administrative processor implements a plurality of functionalities, as shown in step 520.

The method can include installing a plurality of administrative configuration libraries in the administrative server, as shown in step 521.

The method can include forming an administrative database, as shown in step 522.

The method can include forming an administrative web server, wherein the web server receives, verifies and stores the plurality of site signals transmitted from the site processor, as shown in step 523.

The method can include transmitting at least one task to the site database using an administrative task transfer device, as shown in step 524.

The method can include having the administrative processor receive a response from the site data storage, as shown in step 525.

The method can include receiving sensor data, a message, a report, or combinations thereof from the site data storage, as shown in step 526.

The method can include combining the site configuration information with the plurality of site signals to generate site data for equipment at the site, as shown in step 527.

The method can include presenting at least one controls state to a user, as shown in step 528.

The method can include presenting pressure data to a user, as shown in step 529.

The method can include presenting control cycles to a user, as shown in step 530.

The method can include presenting at least one valve cycle to a user, as shown in step 531.

The method can include using at least one user client device to communicate with a plurality of sites, wherein the user client device has a user display, a user processor, and a user data storage in communication with the user processor, as shown in step 532.

The method can include presenting flow data to a user, as shown in step 533.

The method can include presenting control or valve days in service to a user, as shown in step 534.

The method can include presenting temperature data to a user, as shown in step 535.

The method can include presenting stress data to a user, as shown in step 536.

The method can include presenting well information to a user, as shown in step 537.

Figure 16:
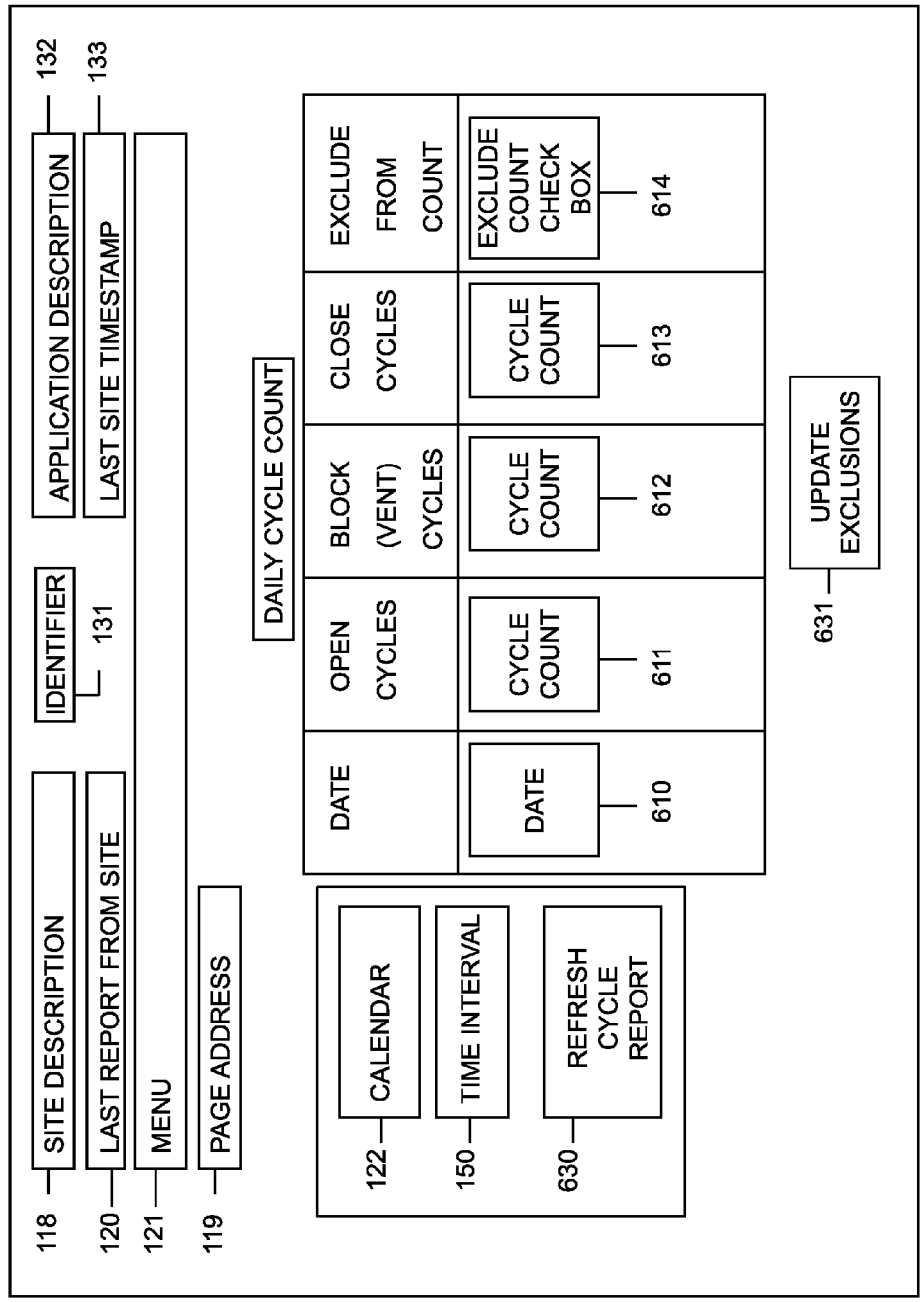
FIG. 16 is a depiction of a cycle report for controls and valves allowing a user to exclude cycles for a specified day from a total cycle count.

FIG. 16 is a page generated from computer instructions in the administrative data storage for presenting a summary of the number of cycles that occur in a single day, also called the daily cycle count, for a control or valve. The computer instructions provide the user with the ability to exclude cycles for one or more days from the total number of accumulated cycles for a control or valve.

The computer instructions can present a site description 118, such as the address of the facility being monitored, a page address 119 to the user as the page occurs within the website, a last report date and time from the site 120, and a menu 121 of reports, presentations, documents, and user administration for selection by the user.

The computer instructions can also present an identifier 131 for the site being monitored, a description of the application 132, and a last site time stamp 133 to the user indicating when information to a requested response was provided to the administrative server from the site processor.

The computer instructions can provide the date of the cycle count 610, an open cycle count 611, such as the number of times the control or valve is in an open state, a block cycle count 612, such as the number of times the control or valve blocked state, a close cycle count 613, such as the number of times the control or valve is in an open state for a defined period of time, and an exclude from count 614 which is a control to eliminate counting a cycle count for a user identified period from a total cycle count.

The computer instructions can enable saving of the excluded daily cycles 631, and refreshing the report 630.

As in other pages, the computer instructions can provide a calendar 122 and a time interval 150.

Figure 17:
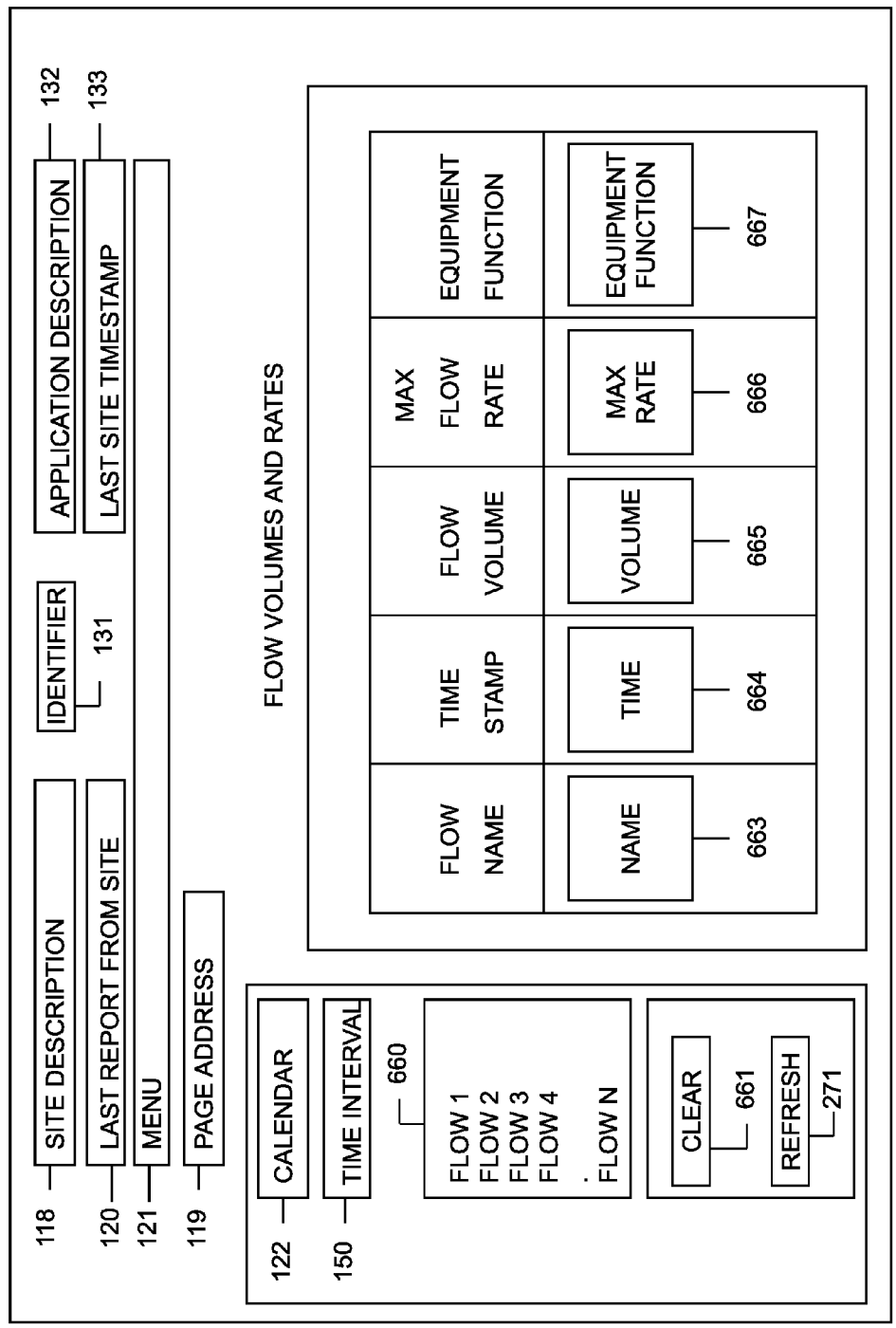
FIG. 17 is a depiction of a flow volume and rate report viewable by a user.

FIG. 17 is a page generated from computer instructions for presenting a plurality of flow volumes and flow rates over a specified time interval.

The computer instructions can present a site description 118, such as the address of the facility being monitored, indicate a page address 119 to the user as the page occurs within the website, present a last report date and time from the site 120, and present a menu 121 of reports, presentations, documents, and user administration for selection by the user.

The computer instructions to generate the page can present an identifier 131 for the site being monitored, a description of the application 132, and a last site time stamp 133 to the user indicating when information to a requested response was provided to the administrative server from the site processor.

The computer instructions to generate the page can provide a calendar 122 to the user and a time interval selection 150 that allows the user to select the time interval covered by the report and to refresh the report.

The computer instructions to generate the page can allow selecting an individual flow or group of flows 660 for viewing, and can allow the user to clear a list of selected flows 661, and to refresh at least one item presented to the user 271.

The computer instructions to generate the page can provide a name of a flow 663 to the flow volume and rates report with a hyperlink to additional reports, provide a time stamp corresponding to when the flow data was collected 664, the flow volume 665, the maximum flow rate 666, and the name of the control function associated with the flow 667.

Figure 18:
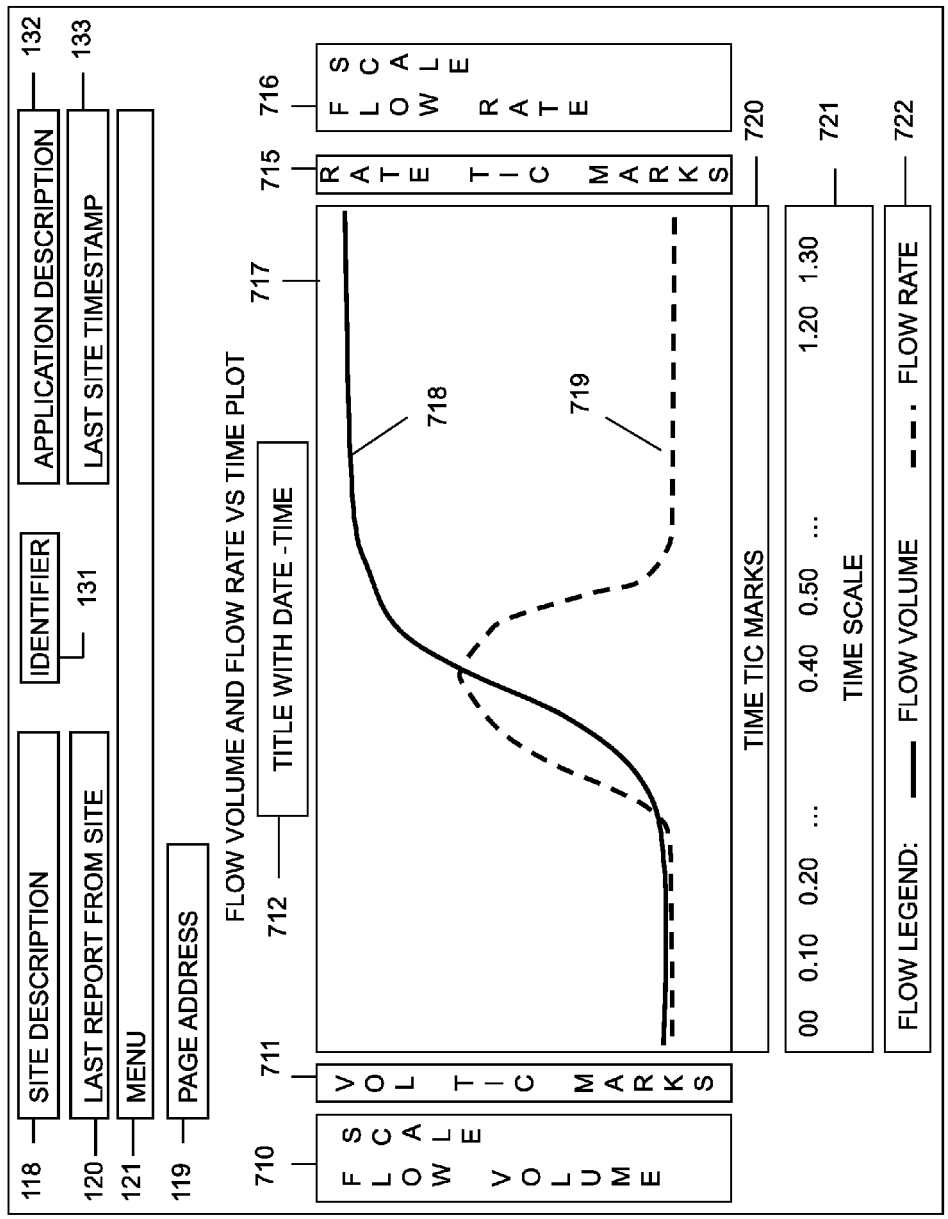
FIG. 18 is a depiction of a detailed graph of flow volume and flow rate versus time.

FIG. 18 is a page generated from computer instructions for presenting a page that shows detailed flow volumes and flow rates versus time. The flow volume and flow rate page can have a graph 717 of flow volume and flow rate versus time.

The computer instructions to generate the page can also present a site description 118, such as the address of the facility being monitored, a page address 119 to the user as the page occurs within the website, a last report date and time from the site 120, and a menu 121 of reports, presentations, documents, and user administration for selection by the user.

Also shown is an identifier 131 for the site being monitored, a description of the application 132, and a last site time stamp 133 to the user indicating when information to a requested response was provided to the administrative server from the site processor.

The title 712 can indicate the date and time of the of the flow data. The flow volume scale 710 can be reported in gallons or other flow volume units. A flow scale rate 716 can also be presented on the page.

The tic marks 711 and 715 can be used to visually position the flow volume and flow rate scales. The legend 722 can be used to distinguish between the flow volume and flow rate data.

The time scale 721 of the graph 717 can be in seconds. The time scale 721 can be from 30 to 180 seconds or longer if required. The lower tic marks 720 can be used to visually position the time scale.

The flow volume data items 718 represent the flow volume as a function of time. The flow rate data items 719 represent the flow rate as a function of time.

While these embodiments have been described with emphasis on the embodiments, it should be understood that within the scope of the appended claims, the embodiments might be practiced other than as specifically described herein.

What is claimed is:

1. A method to monitor a status of a plurality of site equipment at a site from a secondary location while simultaneously enabling preventive maintenance on the plurality of site equipment being monitored, wherein the steps of the method comprise:
   a. providing at a site:
      (i) a data acquisition hardware for receiving and storing sensor data from at least one sensor attached to equipment at the site; and
      (ii) a site processor in communication with a site data storage and receiving sensor data from the data acquisition hardware in communication with a network;
   b. providing at a secondary location:
      (i) an administrative server comprising an administrative processor and an administrative data storage in communication with the network;
   c. connecting at least one user client device to the administrative server via the network, wherein each user client device comprises a user display, a user processor, and a user data storage in communication with the user processor for viewing status and enabling maintenance for a plurality of equipment at a plurality of sites; and d. performing the steps:
   (i) forming a database for sensor data in the site data storage using computer instructions in the site data storage;
   (ii) installing a plurality of site configuration libraries in the site data storage;
   (iii) creating a site based website in the site data storage;
   (iv) receiving and storing sensor data in the site data storage from at least one sensor attached to an equipment at the site;
   (v) receiving sensor data, verifying that the sensor data has been received and storing the sensor data in the database in the site data storage;
   (vi) tracking digital input using a digital input monitor;
   (vii) tracking analog input using an analog input monitor as step;
   (viii) tracking analog detail input using an analog detail monitor;
   (ix) transferring the digital input, the analog input, the analog detail input or combinations thereof using a data transfer device;
   (x) using a site task device to monitor the database, to identify a specific task and to perform the specific task;
   (xi) monitoring the digital input monitor, the analog input monitor, the analog detail monitor, the data transfer device and the site task device by using a site process monitor;
   (xii) having the site processor receive at least one request for status from the administrative processor;
   (xiii) having the site processor respond to the request for status by the administrative processor;
   (xiv) using administrative data storage at a secondary location in communication with an administrative processor, wherein the administrative processor implements a plurality of functionalities;
   (xv) installing a plurality of administrative configuration libraries in the administrative server;
   (xvi) forming an administrative database;
   (xvii) forming an administrative web server, wherein the web server receives, verifies and stores the plurality of site signals transmitted from the site processor;
   (xviii) transmitting at least one task to the site database using an administrative task transfer device;
   (xix) having the administrative processor receive a response from the site data storage;
   (xx) receiving sensor data, a message, a report, or combinations thereof from the site data storage;
   (xxi) combining the site configuration information with the plurality of site signals to generate site data for equipment at the site;
   (xxii) presenting at least one controls state to a user;
   (xxiii) presenting pressure data to a user;
   (xxiv) presenting control cycles to a user;
   (xxv) presenting at least one valve cycle to a user;
   (xxvi) using at least one user client device to communicate with a plurality of sites, wherein the user client device has a user display, a user processor, and a user data storage in communication with the user processor;
   (xxvii) presenting flow data to a user;
   (xxviii) presenting control or valve days in service to a user;
   (xxix) presenting temperature data to a user;
   (xxx) presenting stress data to a user; and
   (xxxi) presenting well information to a user.

2. The method of claim 1, wherein the method further comprises using:
   a. computer instructions to create and store at least one report from the
      digital input monitor, the analog input monitor, the data transfer device, the site task device, the site process monitor and the analog detail monitor; and
   b. computer instructions to create and store at least one message on the digital input monitor, the analog input monitor, the data transfer device, the site task device, the site process monitor and the analog detail monitor.

3. The method of claim 1, wherein the method further comprises using computer instructions in the administrative data storage to:
   a. send a request for status to the site;
   b. receive a response to a request for status;
   c. combine a plurality of site signals with site configuration information to generate site data for the plurality of equipment at the site;
   d. enable a user to clear a display;
   e. enable a user to refresh a display;
   f. enter and display a plurality of current days in service of each control or valve;
   g. enter and display a maximum allowed days in service;
   h. calculate and display a current percentage of maximum days in service; and
   i. enter and display control or valve manufacturing information comprising: manufacturer name, serial number, maximum allowed cycles, maximum number of days in service, or combinations thereof.

4. The method of claim 1, wherein the method further comprises using computer instructions to create a digital input monitor in the site data storage that includes computer instructions to:
   a. receive digital sensor data from the data acquisition hardware;
   b. compare digital sensor data to preexisting digital sensor data or a set of rules in the site data storage and determining if a change in the digital sensor data occurred and storing the digital sensor data if a change occurred; and
   c. store digital sensor data after a preset number of cycles without comparing the digital sensor data to preexisting digital sensor data or a set of rules.

5. The method of claim 1, wherein the method further comprises using computer instructions to create an analog input monitor in the site data storage that includes computer instructions to:
   a. receive analog sensor data from the data acquisition hardware;
   b. compare analog sensor data to preexisting analog sensor data or a set of rules in the site data storage and determining if a change in the analog sensor data occurred and storing the analog sensor data if a change occurred; and
   c. store analog sensor data after a preset number of cycles without comparing the analog sensor data to preexisting analog sensor data or a set of rules.

6. The method of claim 1, wherein the method further comprises using computer instructions to create a data transfer device in the site data storage that includes computer instructions to:
   a. transmit the sensor data stored by the digital input monitor, the analog input monitor, the analog detail monitor, the analog flow monitor, or combinations thereof;
   b. transmit reports and messages stored by the digital input monitor, the analog input monitor, the analog detail monitor, the data transfer device, the site process monitor, the analog flow monitor, and the site task device to the administrative server, user client devices, or combinations thereof from the site data storage;
c. verify a transmission is complete; and d. marking data as transferred.

7. The method of claim 1, wherein the method further comprises using computer instructions to create a site task device in the site data storage that includes computer instructions to:
   a. generate a report;
   b. execute commands to perform maintenance tasks on the site processor; and
   c. execute computer maintenance activity.

8. The method of claim 1, wherein the method further comprises using computer instructions to create a site process monitor in the site data storage that monitors a process of the digital input monitor, the analog input monitor, the data transfer device, the analog detail monitor, the analog flow monitor, the site task device, or combinations thereof.

9. The method of claim 1, wherein the method further comprises using computer instructions to create an analog detail monitor in the site data storage to receive and store analog detail data.

10. The method of claim 1, wherein the method further comprises using computer instructions to create an analog flow monitor in the site data storage to receive and store flow rate and flow volume data.

11. The method of claim 1, wherein the method further comprises installing site configuration libraries in the site data storage, wherein the site configuration libraries comprise:
   a. a digital input monitor configuration library;
   b. an analog input monitor configuration library;
   c. a site task device configuration library;
   d. a data transfer device configuration library;
   e. an analog detail monitor configuration library;
   f. an analog flow monitor configuration library; and
   g. a site process monitor configuration library.

12. The method of claim 1, wherein the method further comprises installing the plurality of administrative configuration libraries in the administrative server, wherein the administrative configuration libraries comprise:
   a. an administrative process monitor configuration library;
   b. an administrative site monitor configuration library;
   c. an administrative task device configuration library; and
   d. an administrative task transfer device configuration library.

13. The method of claim 1, wherein the method further comprises installing in the administrative database site signals comprising: a digital signal, an analog signal, or combinations thereof.

14. The method of claim 1, wherein the method further comprises installing in the administrative database site configuration information comprising: site information, control information, pressure information, control valve information, flow information, user security information, stress information, temperature information, well information or combinations thereof.

15. The method of claim 1, wherein the method further comprises installing in the administrative database site data comprising: control state data, control cycle data, control valve data, pressure data, temperature data, stress data, well data, pneumatic or hydraulic flow rates, pneumatic or hydraulic flow volumes, or combinations thereof.

16. The method of claim 1, wherein the method further comprises using computer instructions to present at least one control state to a user, wherein the computer instructions perform steps that:
   a. present a site description;
   b. present a page address;
   c. present a last report from site;
   d. present a menu of reports, a presentation, a documentation, or the user administration item, for selection by the user;
   e. present a calendar;
   f. present a time scale;
   g. present a control or a group of controls;
   h. present a clear button to activate by a user to clear control choices;
   i. allow the user to shift the time scale back in time and forward in time;
   j. provide a start date and time for a chart requested by the user;
   k. provide a chart legend to the user for the chart; and
   l. provide multiple time scale reports/charts, each chart having: a chart start time, a chart midpoint, and a chart end point; and time division tic marks for the time scale report/chart.

17. The method of claim 1, wherein the method further comprises using computer instructions to present control cycles for equipment on sites to the user connected via the network, wherein the computer instructions perform the following steps:
   a. presenting a site description;
   b. indicating a page address;
   c. presenting a last report form the site;
   d. presenting a menu for control cycles of reports: presentations, documentation, and user administrative items for selection by the user;
   e. presenting a control or group of controls;
   f. presenting a clear button to activate by a user to clear control choices;
   g. presenting a refresh button to activate by a user to refresh the page;
   h. presenting an identifier for a site being monitored;
   i. presenting an application description;
   j. presenting a last site time stamp to a user indicating when information to a requested response was provided to the administrative server from the site processor;
   k. providing a name of a control to be contained in a control cycle report with a hyperlink to additional reports;
   l. providing an identification of the function of a selected control;
   m. providing a location for each selected control; and
   n. providing a cycle count.

18. The method of claim 1, wherein the method further comprises using computer instructions to present pressure data to a user, wherein the computer instructions perform the following steps:
   a. presenting a site description;
   b. indicating a page address;
   c. presenting a last report form the site;
   d. presenting a menu for control cycles of reports: presentations, documentation, and user administrative items for selection by the user;
   e. presenting a calendar of dates to a user;
   f. presenting a time scale to a user;
   g. presenting a control or group of pressures;
   h. presenting a clear button to activate by a user to clear pressure choices;

i. presenting a refresh button to activate by a user to refresh the page;
j. presenting an identifier for a site being monitored;
k. presenting an application description;
l. presenting a last site time stamp to a user indicating when information to a requested response was provided to the administrative server from the site processor;
m. presenting a type of pressure;
n. presenting a pressure scale to the user;
o. allowing the user to shift the time scale back in time and forward in time;
p. presenting a hyperlink to a pressure change detail;
q. presenting a plurality of pressure type reports;
r. providing a start date for a chart requested by the user;
s. presenting a start time and end time scale; and
t. presenting time division tic marks.

19. The method of claim 1, wherein the method further comprises presenting valve cycles to a user by using the following steps:
    a. using computer instructions to present a site description;
    b. using computer instructions to indicate a page address to the user as the page occurs within the website;
    c. using computer instructions to present a last report date from the site;
    d. using computer instructions to present a menu of reports, presentations, documentation, user administration for selection by the user;
    e. using computer instructions for selecting an individual or a group of controls for viewing;
    f. using computer instructions allowing the user to clear a list of selected individual controls or groups of controls;
    g. using computer instructions for enabling the user to use a refresh button at least one item presented to the user that is a time based item;
    h. using computer instructions for presenting an identifier for the site being monitored;
    i. using computer instructions for presenting an application description;
    j. using computer instructions for presenting a last site time stamp to the user indicating when information to a requested response was provided to the administrative server from the site processor;
    k. using computer instructions to provide a control name;
    l. using computer instructions to provide a valve identification;
    m. using computer instructions to provide a function of each valve or control;
    n. using computer instructions to provide a location of each valve or each control;
    o. using computer instructions to provide a cycle count;
    p. using computer instructions to provide a cycle count maximum; and
    q. using computer instructions to provide a percent maximum as a percent of current cycle count compared to a maximum cycle count to the user for each valve selected.

20. The method of claim 1, comprising presenting valve cycles to a user by using the following steps:
    a. using computer instructions to present a site description;
    b. using computer instructions to indicate a page address to the user as the page occurs within the website;
    c. using computer instructions to present a last report date from the site;
    d. using computer instructions to present a menu of reports, presentations, documentation, user administration for selection by the user;
    e. using computer instructions for selecting an individual or a group of controls for viewing;
    f. using computer instructions allowing the user to clear a list of selected individual controls or groups of controls;
    g. using computer instructions for enabling the user to use a refresh button at least one item presented to the user that is a time based item;
    h. using computer instructions for presenting an identifier for the site being monitored;
    i. using computer instructions for presenting an application description;
    j. using computer instructions for presenting a last site time stamp to the user indicating when information to a requested response was provided to the administrative server from the site processor;
    k. using computer instructions to provide a control name;
    l. using computer instructions to provide a valve identification;
    m. using computer instructions to provide a function of each valve or control;
    n. using computer instructions to provide a location of each valve or each control;
    o. using computer instructions to provide a number of days in service for the valve;
    p. using computer instructions to provide a maximum allowed number of days in service for the valve; and
    q. using computer instructions to provide a percentage of number of days in service compared to a maximum allowed number of days in service for each valve selected.

21. The method of claim 1, presenting pressure change details using computer instructions to generate a pressure change detail window comprising:
    a. a site description;
    b. a site identifier;
    c. an application description;
    d. a last site time stamp;
    e. a last report from site;
    f. a menu;
    g. a page address to the user as the page occurs within the website administrator;
    h. a start date time;
    i. a pressure type;
    j. a pressure history graph;
    k. a pressure change graph;
    l. a non-detailed pressure scale for a non-detailed pressure graph;
    m. a detailed pressure scale for a detailed pressure change graph;
    n. time division tic marks for the non-detailed pressure graph;
    o. time division tic marks for the detailed pressure change graph;
    p. a start time and end time for the non-detailed pressure graph;
    q. a time scale for the detailed pressure change graph;
    r. a pressure legend;
    s. a select pressure change control;
    t. a clear all button of a list of selected individual pressure changes; and
    u. a refresh button for enabling the user to refresh at least one item presented to the user that is a time based item.

22. The method of claim 1, wherein the method further comprises using computer instructions to present a control state detail page comprising:
    a. a site description;
    b. a page address;
    c. a last report date and time from the site;

d. a menu of reports, presentations, documentation, user administration for selection by the user;
e. an identifier for the site being monitored;
f. a description of the application;
g. a last site time stamp to the user indicating when information to a requested response was provided to the administrative server from the site processor;
h. an individual or a group of controls for viewing;
i. a clear button to clear a list of selected individual controls or groups of controls;
j. a refresh button for at least one item presented to the user that is a time based item;
k. a calendar;
l. a time scale selector;
m. a time shift;
n. a start date and time;
o. a control history tabular window;
p. a start date and time;
q. a stop date and time;
r. a state; and
s. a time duration.

23. The method of claim 1, wherein the method further comprises using computer instructions to edit at least one cycle count for a valve cycle or control cycle by using computer instructions to present:
a. a description of the site;
b. a description of the application;
c. a site identifier;
d. a last report received from the site;
e. a last site time stamp to indicate when information to a requested response was provided to the administrative server from the site processor;
f. a menu for selecting other reports and displays;
g. a page address;
h. a control or valve description;
i. a select calendar date;
j. a reason description;
k. control or valve information;
l. a reset cycle count selection;
m. an entered cycle count;
n. a current cycle count;
o. a reset or change number of days in service selection;
p. an entered number of days in service;
q. a current days in service;
r. a save current cycle and days in service information functionality;
s. a return to list without saving functionality; and
t. a control valve diagram.

24. The method of claim 1, wherein the method further comprises using computer instructions to generate a multi-equipment multi-time-period report to a user client device depicting:
a. a plurality of control names and states;
b. segment dates;
c. time tic marks for each control name and state;
d. a plurality of start segment times and dates;
e. a plurality of mid segment times and dates; and
f. a plurality of end segment times and dates.

25. The method of claim 1, wherein the method further comprises using computer instructions to present a summary daily cycle count depicting:
a. a site description;
b. a page address;
c. a last report date from the site;
d. a menu of reports, presentations, documents, and user administration for selection by the user;
e. an identifier for the site being monitored;
f. a description of the application;
g. a last site time stamp to the user indicating when information to a requested response was provided to the administrative server from the site processor;
h. a calendar;
i. a time interval;
j. a date of the cycle count;
k. an open cycle count;
l. a block cycle count;
m. a close cycle count;
n. an exclude from cycle count;
o. a save excluded daily cycles functionality; and
p. a refresh a report functionality.

26. The method of claim 1, wherein the method further comprises using computer instructions to present flow volume and rates of hydraulic flow, hydraulic volume, pneumatic flow, pneumatic volume, and combinations thereof to perform the steps:
a. using computer instructions to present a site description;
b. using computer instructions to indicate a page address of the hydraulic flow rate and flow volume data, pneumatic flow rate and flow volume to the user or combinations thereof;
c. using computer instructions to present a last report and time from the site for hydraulic flow and hydraulic volume, pneumatic flow and pneumatic volume or combinations thereof;
d. using computer instructions to provide a menu of reports, presentations, documentation, and user administrative items for selection by the user;
e. using computer instructions to present a calendar allowing the user to select a time interval for viewing hydraulic flow and hydraulic volume information, pneumatic flow and pneumatic volume, and combinations thereof, from the site;
f. using computer instructions to present an identifier;
g. using computer instructions for presenting an application description;
h. using computer instructions to present a last site time stamp;
i. using computer instructions to present a time interval selector allowing the user to select a time interval for reviewing hydraulic flow and hydraulic volume information, pneumatic flow and pneumatic volume, or combinations thereof, from the site;
j. using computer instructions to enable the user to select a hydraulic or pneumatic flow for viewing from the site;
k. using computer instructions to present a flow name to identify the hydraulic or pneumatic flow from the site;
l. using computer instructions to present a time stamp to the user indicating when hydraulic or pneumatic flow rate information and hydraulic or pneumatic volume information was provided to the administrative server from the site processor from the site;
m. using computer instructions to present the hydraulic flow volume, pneumatic flow volume, or combinations thereof, to the user;
n. using computer instructions to present a maximum flow rate for the hydraulic flow rate, pneumatic flow rate, or combinations thereof, to the user;
o. using computer instructions to present the equipment function associated with the hydraulic flow volume, pneumatic flow volume, hydraulic flow rate, pneumatic flow fate, or combinations thereof;
p. using computer instructions to enable the user to select a plurality of hydraulic or pneumatic volume and hydraulic or pneumatic flow events and view a time versus flow hydraulic or pneumatic volume and time versus hydraulic or pneumatic flow rate chart;
q. using computer instructions to enable the user to clear a list of selected hydraulic flow volumes or pneumatic flow volumes, hydraulic flow rates or pneumatic flow rates; and
r. using computer instructions to enable the user to refresh hydraulic flow volumes and hydraulic flow rates report, and the pneumatic flow volumes and pneumatic flow rates report.

* * * * *